(12) United States Patent
Wang

(10) Patent No.: US 10,872,277 B1
(45) Date of Patent: Dec. 22, 2020

(54) DISTRIBUTED CLASSIFICATION SYSTEM

(71) Applicant: SAS Institute Inc., Cary, NC (US)

(72) Inventor: Yingjian Wang, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/935,586

(22) Filed: Jul. 22, 2020

Related U.S. Application Data

(60) Provisional application No. 63/005,706, filed on Apr. 6, 2020, provisional application No. 62/963,483, filed on Jan. 20, 2020.

(51) Int. Cl.
| | | |
|---|---|---|
| G06K 9/62 | (2006.01) | |
| G06F 17/18 | (2006.01) | |
| G06F 17/16 | (2006.01) | |
| G06N 7/00 | (2006.01) | |

(52) U.S. Cl.
CPC ........... *G06K 9/6277* (2013.01); *G06F 17/16* (2013.01); *G06F 17/18* (2013.01); *G06K 9/628* (2013.01); *G06N 7/005* (2013.01)

(58) Field of Classification Search
None
See application file for complete search history.

(56) References Cited

PUBLICATIONS

Lui, Haitao et al.; When Gaussian Process Meets Big Data: A Review of Scalable GPs; IEEE Transactions on Neural Networks and Learning Systems; 2020; 19 pages. (Year: 2020).*

Mair, Sebastian et al.; Distributed Robust Gaussian Process Regression; 2017; Leuphana University; pp. 1-21. (Year: 2017).*

Girolami, Marke et al.; Data Integration for Classification Problems Employing Gaussian Process Priors; 2007; 8 pages. (Year: 2007 ).*

Smola, Alex J. et al.; Laplace Propagation; 2004; 8 pages. (Year: 2004).*

Smola, Alex J. et al.; Laplace Propagation; 2003; 8 pages. (Year: 2003).*

Sklearn GPC: printed from https://scikit-learn.org/stable/modules/gaussian_process.html?highlight=gaussianprocessclassifier printed on May 26, 2020, 2007-2019, scikit-learn developers (BSD License).

(Continued)

*Primary Examiner* — Stanley K. Hill
(74) *Attorney, Agent, or Firm* — Bell & Manning, LLC

(57) ABSTRACT

A computing system classifies distributed data. A first computation request is sent to worker computing devices. A first response is received from each worker computing device. Each first response includes a first matrix computed as a second order derivative of a logarithm of a predefined likelihood function on a subset of training data distributed to each respective worker computing device. A global first matrix is defined by concatenating the first matrix from each worker computing device. A kernel matrix is computed using the training data and a predefined kernel function. A second computation request is sent to the worker computing devices. The second computation request indicates that each worker computing device compute a classification probability for each observation vector distributed to a respective worker computing device using the defined global first matrix and the computed kernel matrix. The determined classification probability is output for each observation vector.

30 Claims, 22 Drawing Sheets
(6 of 22 Drawing Sheet(s) Filed in Color)

(56) References Cited

PUBLICATIONS

Wikipedia, Cholesky decomposition, retrieved from https://en.wikipedia.org/w/index.php?title=Cholesky_decomposition&oldid=958717026, last edited May 25, 2020.

Wikipedia, Error Function, retrieved from https://en.wikipedia.org/w/index.php?title+Error_function&oldid=959052386, printed Jun. 24, 2020.

Williams et al., "Bayesian Classification with Gaussian Process", IEEE Trans. Pattern Anal. Mach. Intell. 1998, vol. 20, No. 12, pp. 1342-1351.

Wikipedia, Lemmatisation, retrieved from https://en.wikipedia.org/w/index.php?title=Lemmatisation&oldid=948344582, last edited Mar. 31, 2020.

Wikipedia, Logit, retrieved from https://en.wikipedia.org/w/index.php?title=Logit&oldid=966729139, last edited Jul. 8, 2020.

Wikipedia, Probit, Retrieved from https://en.wikipedia.org/w/index.php?title=Probit&oldid=956140558, last edited on May 11, 2020.

Carl Eduard Rasmussen and Christopher K.I. Williams, Chapter 3, Classification, "Gaussian Processes for Machine Learning", MIT Press 2006, 46 pages.

Wikipedia, Sigmoid function, Retrieved from https://en.wikipedia.org/w/index.php?title=Sigmoid_function&oldid=963563127, last edited on Jun. 20, 2020.

Nickisch et al., "Approximations for Binary Gaussian Process Classification," Journal of Machine Learning Research 9 (2008) 2035-2078.

Hensman et al., "Scalable Variational Gaussian Process Classitication," Proceeaings of the $18^{th}$ International Conference on Artificial Intelligence and Statistics, 2015, vol. 38, pp. 351-360.

Rasmussen, C. E. and Nickisch, H. (2010). Gaussian processes for machine learning (GPML) Toolbox. J. Mach. Learn. Res., 11, 3011-3015.

Rue et al., Approximate Bayesian inference for latent Gaussian models by using integrated nested Laplace approximations. Journal of the Royal Statistical Society: Series B (Statistical Methodology), 71(2), 319-392.

\* cited by examiner

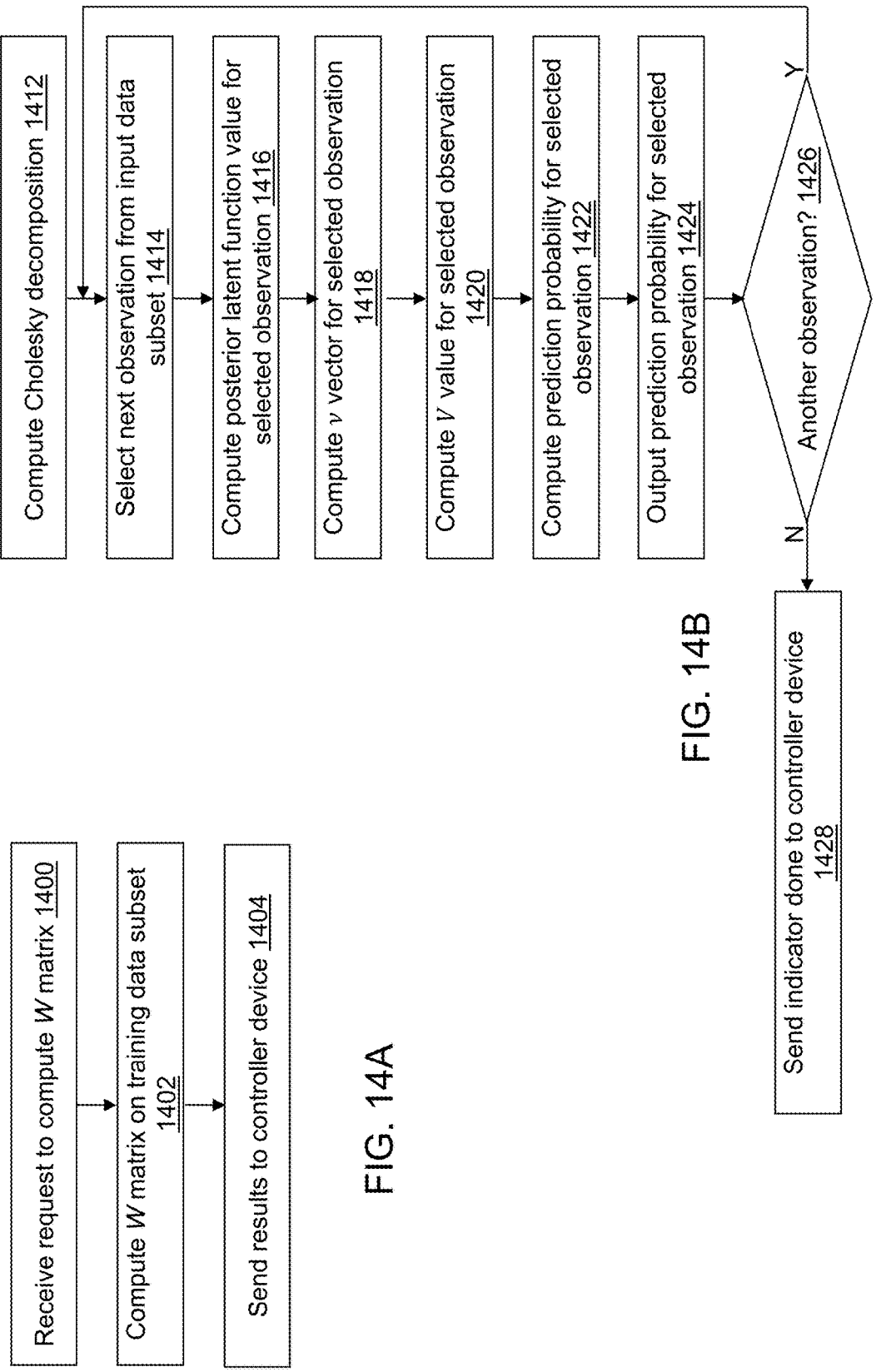

DISTRIBUTED CLASSIFICATION SYSTEM

CROSS-REFERENCE TO RELATED APPLICATIONS

The present application claims the benefit of and priority to 35 U.S.C. § 119(e) to U.S. Provisional Patent Application No. 63/005,706 filed Apr. 6, 2020, the entire contents of which are hereby incorporated by reference. The present application also claims the benefit of and priority to 35 U.S.C. § 119(e) to U.S. Provisional Patent Application No. 62/963,483 filed Jan. 20, 2020, the entire contents of which are hereby incorporated by reference.

BACKGROUND

Gaussian process classification has been applied to classification tasks and includes parameters that are adaptive to the data to which the classification is applied and for which a Gaussian process model is defined. A classic inference method for Gaussian process classification, called the Laplacian approximation has been shown to yield very good classification results. However, Gaussian process classification with Laplacian approximation is unworkable with relatively large datasets, e.g., datasets with more than a million of observations, due to the prohibitive amount of computing time incurred.

SUMMARY

In an example embodiment, a computer-readable medium is provided having stored thereon computer-readable instructions that when executed by a computing device, cause the computing device to execute a classification model on distributed data. A first computation request is sent to a plurality of worker computing devices. A first response to the first computation request is received from each worker computing device of the plurality of worker computing devices. Each first response includes a first matrix computed as a second order derivative of a logarithm of a predefined likelihood function on a subset of training data distributed to each respective worker computing device. The training data includes a plurality of observation vectors. Each observation vector of the plurality of observation vectors includes a value for each variable of a plurality of variables. A global first matrix is defined by concatenating the first matrix from each worker computing device of the plurality of worker computing devices. A kernel matrix is computed using an entirety of the training data and a predefined kernel function. A second computation request is sent to the plurality of worker computing devices. The second computation request indicates that each worker computing device compute a classification probability for each observation vector of the plurality of observation vectors distributed to a respective worker computing device using the defined global first matrix and the computed kernel matrix. The determined classification probability is output for each observation vector of the plurality of classified observation vectors.

In another example embodiment, a system is provided. The system includes, but is not limited to, a processor and a computer-readable medium operably coupled to the processor. The computer-readable medium has instructions stored thereon that, when executed by the processor, cause the system to execute a classification model on distributed data.

In yet another example embodiment, a method of executing a classification model on distributed data is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 14A and 14B depict flow diagrams illustrating examples of operations performed by the worker device of FIG. 11 in accordance with an illustrative embodiment.

DETAILED DESCRIPTION

Classification is a recognition, differentiation, and organization of observed observation data into categories or classes to which labels may be assigned that identify a characteristic of each observation. The most common classification is a binary classification, where the data are labeled between two classes such as '0' or '1'. Classification is a supervised learning task that uses training data that has been labeled to train a classification model that can be applied to classify unclassified or unlabeled data.

Gaussian process classification (GPC) implements Gaussian processes (GP) for classification purposes, more specifically for probabilistic classification in a nonparametric way, where test predictions take the form of class probabilities. GPC places a GP prior on a latent function, which is then squashed through a sigmoid function to obtain the probabilistic classification. The latent function may be a so-called nuisance function whose values are not observed and are not relevant by themselves. The purpose of the latent function is to provide a convenient formulation of the classification model and is integrated out during the process of predicting a class.

In contrast to a regression setting, the posterior of the latent function vector in GPC is not Gaussian even for a GP prior since a Gaussian likelihood is inappropriate for discrete class labels. Rather, a non-Gaussian likelihood corresponding to the logistic link function (logit) may be used.

There are two major methods for model inference for GPC, the Laplacian approximation (LA) and stochastic variational inference (SVI). The LA method uses a Gaussian to approximate the usually not Gaussian model posterior. LA can also be regarded as a variational inference method that has the advantage of accurate classification results with the disadvantage of being computationally slow and, as a result, inapplicable to large datasets. SVI uses a stochastic search in the model inference process and a variational posterior on a number of randomly selected minibatches of training data. SVI is computationally fast, but less accurate including sometimes yielding poor classification results.

A model training application 222 described herein provides a distributed LA inference method for GPC so that the more accurate LA inference method for GPC can be applied to large datasets distributed across a plurality of computing devices. Existing LA inference methods for GPC cannot be applied to large, distributed data. Model training application 222 provides no loss in classification accuracy with a significantly faster computation time using a distributed computer processing system.

Figure 1:
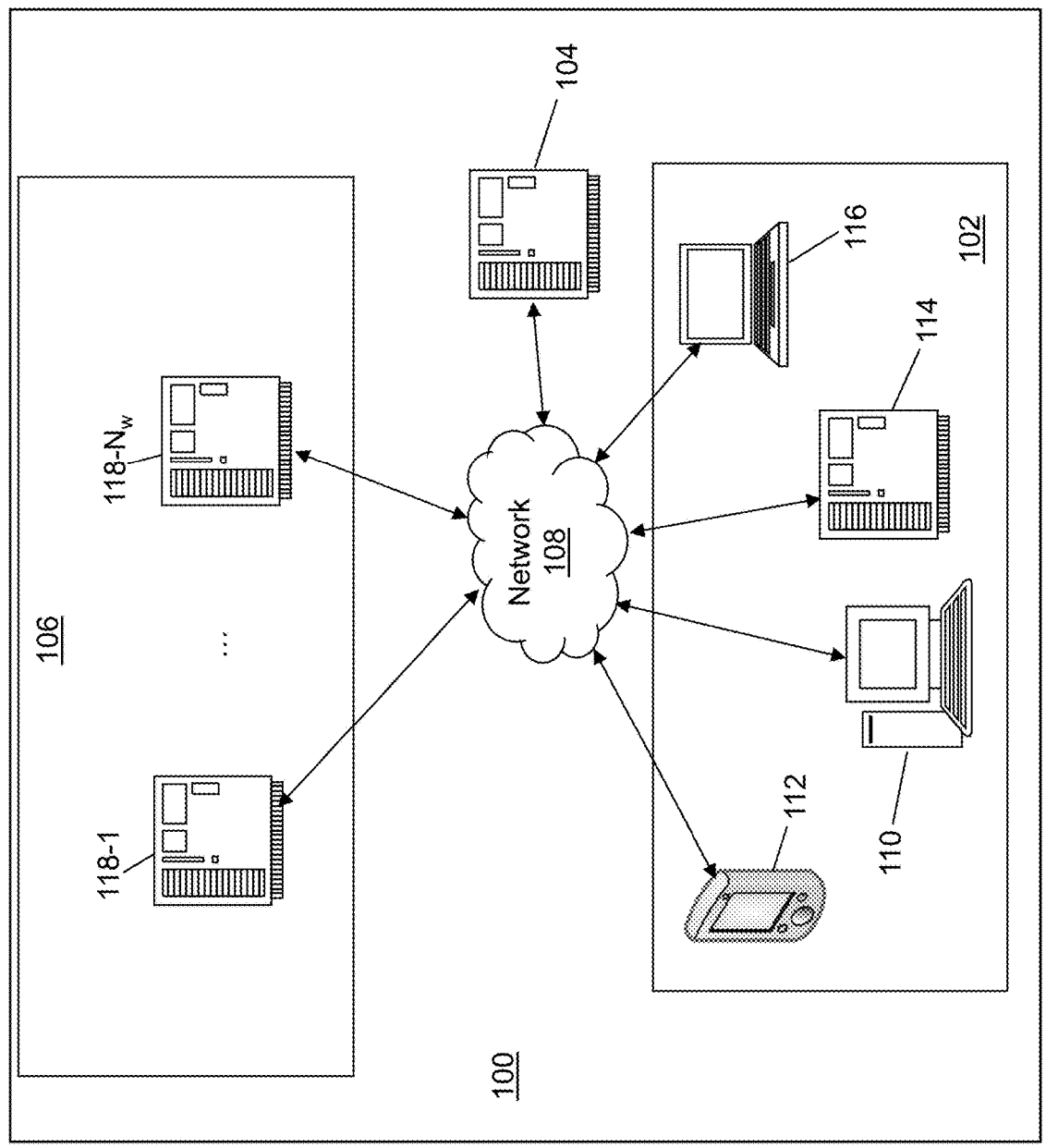
FIG. 1 depicts a block diagram of a classification model training system in accordance with an illustrative embodiment.

Referring to FIG. 1, a block diagram of a classification model training system 100 is shown in accordance with an illustrative embodiment. In an illustrative embodiment, classification model training system 100 may include a user system 102, a controller device 104, a worker system 106, and a network 108. Each of user system 102, controller device 104, and worker system 106 may be composed of one or more discrete computing devices in communication through network 108. User system 102 and controller device 104 may be integrated into a single computing device.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from controller device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
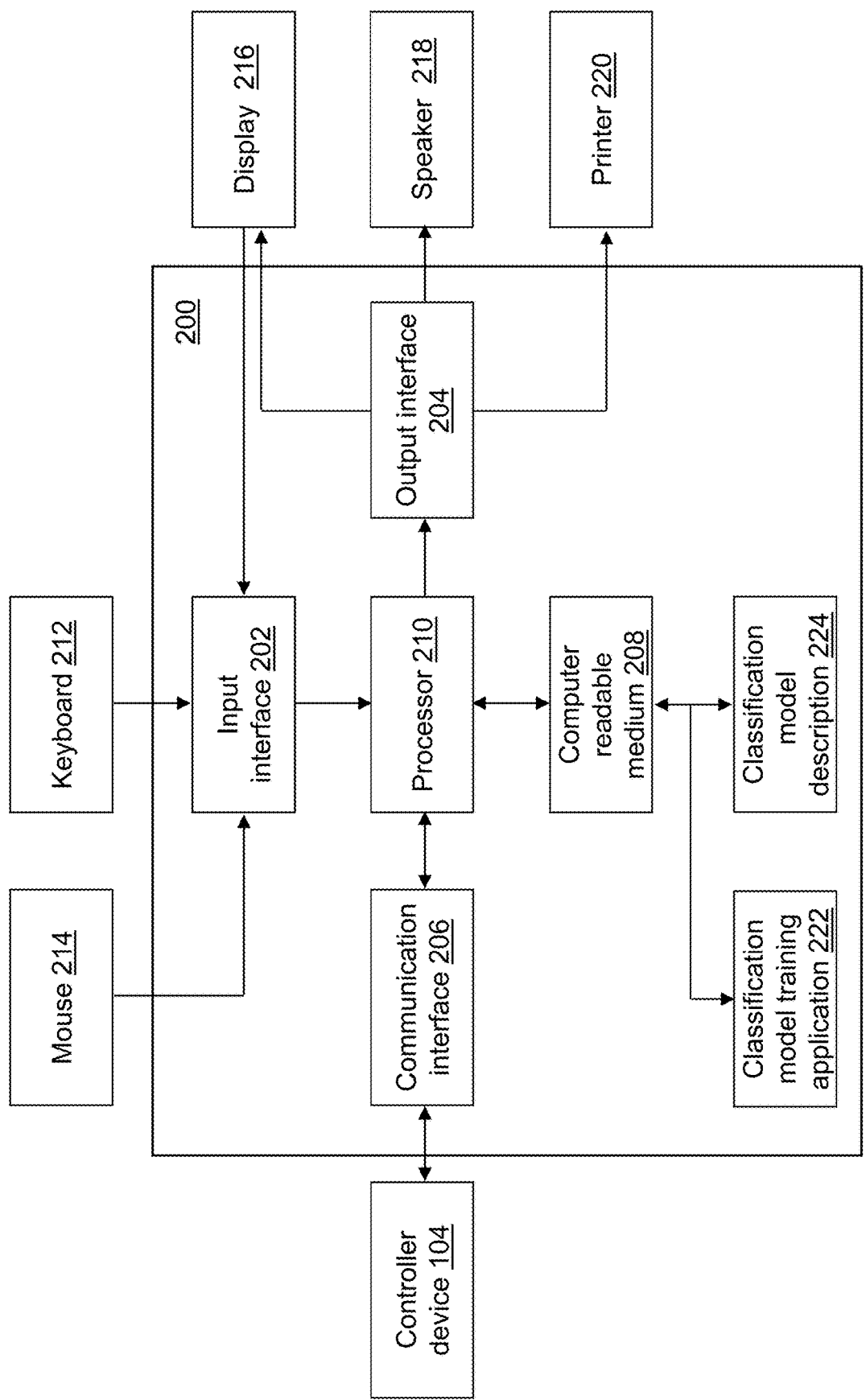
FIG. 2 depicts a block diagram of a user device of the classification model training system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, classification model training application 222, and a classification model description 224. Each computing device of user system 102 may be executing classification model training application 222 of the same or different type. User device 200 may execute classification model training application 222 that triggers creation of classification model description 224.

Referring again to FIG. 1, controller device 104 can include any form factor of computing device. For illustration, FIG. 1 represents controller device 104 as a server computer. Controller device 104 may send and receive signals through network 108 to/from user system 102 and/or to/from worker system 106. Controller device 104 may communicate using various transmission media that may be wired and/or wireless as understood by those skilled in the art. Controller device 104 may be implemented on a plurality of computing devices of the same or different type. Classification model training system 100 further may include a plurality of controller devices.

Figure 3:
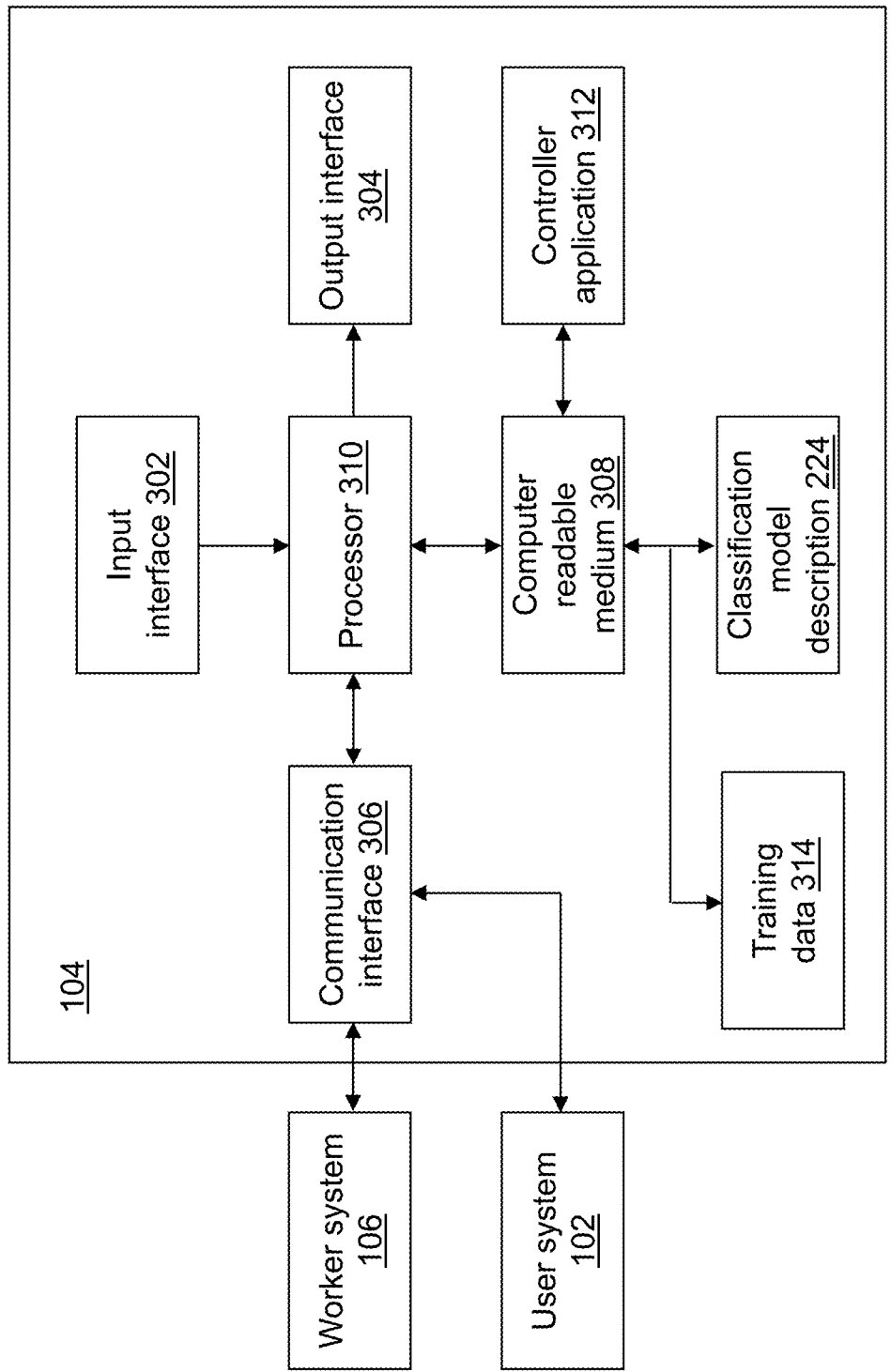
FIG. 3 depicts a block diagram of a controller device of the classification model training system of FIG. 1 in accordance with an illustrative embodiment.

For illustration, referring to FIG. 3, a block diagram of controller device 104 is shown in accordance with an illustrative embodiment. Controller device 104 may include a second input interface 302, a second output interface 304, a second communication interface 306, a second computer-readable medium 308, a second processor 310, a controller application 312, training data 314, and classification model description 224. Controller device 104 may execute controller application 312 that creates classification model description 224.

Referring again to FIG. 1, the one or more computing devices of worker system 106 may include computers of any form factor such as a desktop, a server, a laptop, etc. For example, in the illustrative embodiment, worker system 106 includes a first server computer 118-1, . . . , and a $N_w^{th}$ server computer 118-$N_w$, where $N_w$ indicates a number of worker computing devices of worker system 106. Each server computer may support use of a plurality of threads. The computing devices of worker system 106 may send and receive signals through network 108 to/from controller device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
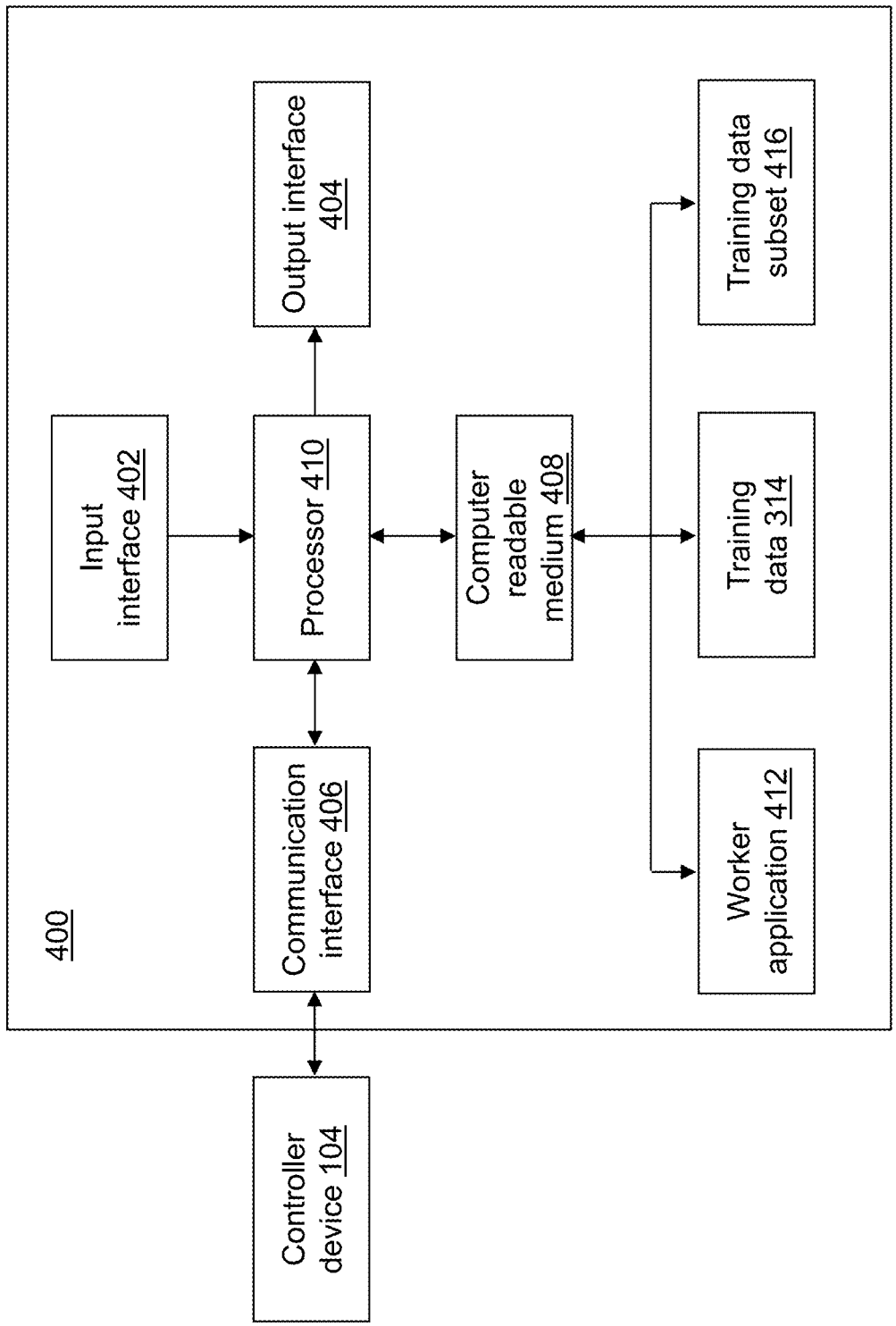
FIG. 4 depicts a block diagram of a worker device of the classification model training system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first server computer 118-1, . . . , and $N_w^{th}$ server computer 118-$N_w$ may be an instance of worker device 400. Worker device 400 may include a third input interface 402, a third output interface 404, a third communication interface 406, a third computer-readable medium 408, a third processor 410, a worker application 412, training data 314, and a training data subset 416. A copy of training data 314 is stored on each worker device 400 of worker system 106 with the data in the same order on each worker device 400 of worker system 106. Training data 314 is further distributed into training data subset 416 distributed across each worker device 400 of worker system 106 such that a unique portion of training data 314 is distributed onto each of the $N_w$ worker computing devices of worker system 106 and the entirety of training data 314 is distributed. As a result, a size of training data 314 is selected to fit on each worker device 400 of worker system 106 in addition to training data subset 416. In an alternative embodiment, controller device 104 may also be used to perform the operations described for each worker device 400 with a copy of training data 314 and a portion of training data 314 distributed to controller device 104.

Referring again to FIG. 2, each user device 200 of user system 102 may include the same or different components and combinations of components. Fewer, different, and additional components may be incorporated into user device 200.

Input interface 202 provides an interface for receiving information from the user or another device for entry into user device 200 as understood by those skilled in the art. Input interface 202 may interface with various input technologies including, but not limited to, a keyboard 212, a microphone, a mouse 214, a display 216, a track ball, a keypad, one or more buttons, etc. to allow the user to enter information into user device 200 or to make selections presented in a user interface displayed on display 216.

The same interface may support both input interface 202 and output interface 204. For example, display 216 comprising a touch screen provides a mechanism for user input and for presentation of output to the user. User device 200 may have one or more input interfaces that use the same or a different input interface technology. The input interface technology further may be accessible by user device 200 through communication interface 206.

Output interface 204 provides an interface for outputting information for review by a user of user device 200 and/or for use by another application or device. For example, output interface 204 may interface with various output technologies including, but not limited to, display 216, a speaker 218, a printer 220, etc. User device 200 may have one or more output interfaces that use the same or a different output interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and/or messages may be transferred between user device 200 and controller device 104 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD, DVD, an external hard drive, etc. One or more external hard drives further may be connected to user device 200 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification model training application 222 performs operations associated with triggering training of a classification model using data stored in training data 314. Information that describes the trained classification model is stored in classification model description 224. Data describing the trained classification model may be read from classification model description 224 and used to predict classifications for data stored in input data that may be distributed across a second worker system 806 (shown referring to FIG. 8). Some or all of the operations described herein may be embodied in classification model training application 222. The operations may be implemented using hardware, firmware, software, or any combination of these methods.

Referring to the example embodiment of FIG. 2, classification model training application 222 is implemented in software (comprised of computer-readable and/or computer-executable instructions) stored in computer-readable medium 208 and accessible by processor 210 for execution of the instructions that embody the operations of classification model training application 222. Classification model training application 222 may be written using one or more programming languages, assembly languages, scripting languages, etc. Classification model training application 222 may be integrated with other analytic tools. As an example, classification model training application 222 may be part of an integrated data analytics software application and/or software architecture such as that offered by SAS Institute Inc. of Cary, N.C., USA. Merely for illustration, classification model training application 222 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification model training application 222 may be implemented as a Web application. For example, classification model training application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Referring to FIG. 3, fewer, different, or additional components may be incorporated into controller device 104. Second input interface 302 provides the same or similar functionality as that described with reference to input interface 202 of user device 200 though referring to controller device 104. Second output interface 304 provides the same or similar functionality as that described with reference to output interface 204 of user device 200 though referring to controller device 104. Second communication interface 306 provides the same or similar functionality as that described with reference to communication interface 206 of user device 200 though referring to controller device 104. Data and messages may be transferred between controller device 104 and user device 200 using second communication interface 306. Second computer-readable medium 308 provides the same or similar functionality as that described with reference to computer-readable medium 208 of user device 200 though referring to controller device 104. Second processor 310 provides the same or similar functionality as that described with reference to processor 210 of user device 200 though referring to controller device 104.

Controller application 312 performs operations associated with training a classification model based on inputs provided from user device 200 and using the computing devices of worker system 106. The operations may be implemented using hardware, firmware, software, or any combination of these methods. Referring to the example embodiment of FIG. 3, controller application 312 is implemented in software (comprised of computer-readable and/or computer-executable instructions) stored in second computer-readable medium 308 and accessible by second processor 310 for execution of the instructions that embody the operations of controller application 312. Controller application 312 may be written using one or more programming languages, assembly languages, scripting languages, etc. Controller application 312 may be implemented as a Web application.

Controller application 312 may be integrated with other analytic tools. As an example, controller application 312 may be part of an integrated data analytics software application and/or software architecture such as that offered by SAS Institute Inc. of Cary, N.C., USA. For example, controller application 312 may be part of SAS® CAS developed and provided by SAS Institute Inc. of Cary, N.C., USA. Merely for further illustration, controller application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®.

Referring to FIG. 4, fewer, different, and additional components may be incorporated into worker device 400. Each worker device 400 of worker system 106 may include the same or different components or combination of components. Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between controller device 104 and worker device 400 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Worker application 412 may be integrated with other analytic tools. As an example, worker application 412 may be part of an integrated data analytics software application and/or software architecture such as that offered by SAS Institute Inc. of Cary, N.C., USA. For example, worker application 412 may be part of SAS® CAS. Merely for further illustration, worker application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®.

Classification model training application 222, controller application 312, and worker application 412 may be the same or different applications that are integrated in various manners to train a classification model using training data 314 and training data subset 416.

Training data 314 may include, for example, a plurality of rows and a plurality of columns. The plurality of rows may be referred to as observation vectors or records (observations), and the columns may be referred to as variables. In an alternative embodiment, training data 314 may be transposed. The plurality of variables defines a vector $x_i$ for each observation vector i=1, 2, . . . , N, where N is a number of the observation vectors included in training data 314. Training data 314 includes a target variable value $y_i$ for each observation vector that indicates a label, or class, or other characteristic defined for the respective observation vector $x_i$. Training data 314 may include additional variables that are not included in the plurality of variables.

Training data 314 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

In data science, engineering, and statistical applications, data often consists of multiple measurements (across sensors, characteristics, responses, etc.) collected across multiple time instances (patients, test subjects, etc.). These measurements may be collected in training data 314 for analysis and processing. Training data 314 may include data captured as a function of time for one or more physical objects. The data stored in training data 314 may be captured at different time points periodically, intermittently, when an event occurs, etc. Training data 314 may include data captured at a high data rate such as 200 or more observation vectors per second for one or more physical objects. One or more columns of training data 314 may include a time and/or date value. Training data 314 may include data captured under normal and abnormal operating conditions of the physical object.

One or more variables of the plurality of variables may describe a characteristic of a physical object. For example, if training data 314 includes data related to operation of a vehicle, the variables may include a type of vehicle, an oil pressure, a speed, a gear indicator, a gas tank level, a tire pressure for each tire, an engine temperature, a radiator level, etc. some or all of which may be measured by a sensor.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, training data 314 may include image data captured by medical imaging equipment (i.e., computed tomography image, magnetic resonance image, x-ray image, ultrasound image, etc.) of a body part of a living thing. A subset of the image data is labeled and captured in training data 314, for example, as either indicating existence of a medical condition or non-existence of the medical condition. Training data 314 may include a reference to image data that may be stored, for example, in an image file or in a video file, and the existence/non-existence label associated with each image file or video file. Training data 314 may include a plurality of such references. The existence/non-existence label or other label may be defined by a clinician or expert in the field to which data stored in training data 314 relates.

The data stored in training data 314 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in training data 314 may be generated as part of the Internet of Things (IoT), where things (e.g., machines, devices, phones, sensors) can be connected to networks and the data from these things collected and processed within the things and/or external to the things before being stored in training data 314. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in training data 314.

The data stored in training data 314 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Training data 314 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training data 314 may be stored using various data structures as known to those skilled in the art including one or more files of a file system, a relational database, one or more tables of a system of tables, a structured query language database, etc. on controller device 104 and/or on worker system 106. Controller device 104 may coordinate access to a copy of training data 314 sent to each worker device 400 of worker system 106. Controller device 104 further may coordinate access to training data 314 that is distributed across worker system 106 such that each worker device 400 stores a subset of training data 314. For example, training data 314 may be stored in a cube distributed across a grid of computers as understood by a person of skill in the art. As another example, training data 314 may be stored in a multi-node Hadoop® class. For instance, Apache™ Hadoop® is an open-source software framework for distributed computing supported by the Apache Software Foundation. As another example, training data 314 may be stored in a cloud of computers and accessed using cloud computing technologies, as understood by a person of skill in the art. The SAS® LASR™ Analytic Server may be used as an analytic platform to enable multiple users to concurrently access data stored in training data 314. The SAS Viya open, cloud-ready, in-memory architecture also may be used as an analytic platform to enable multiple users to concurrently access data stored in training data 314. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
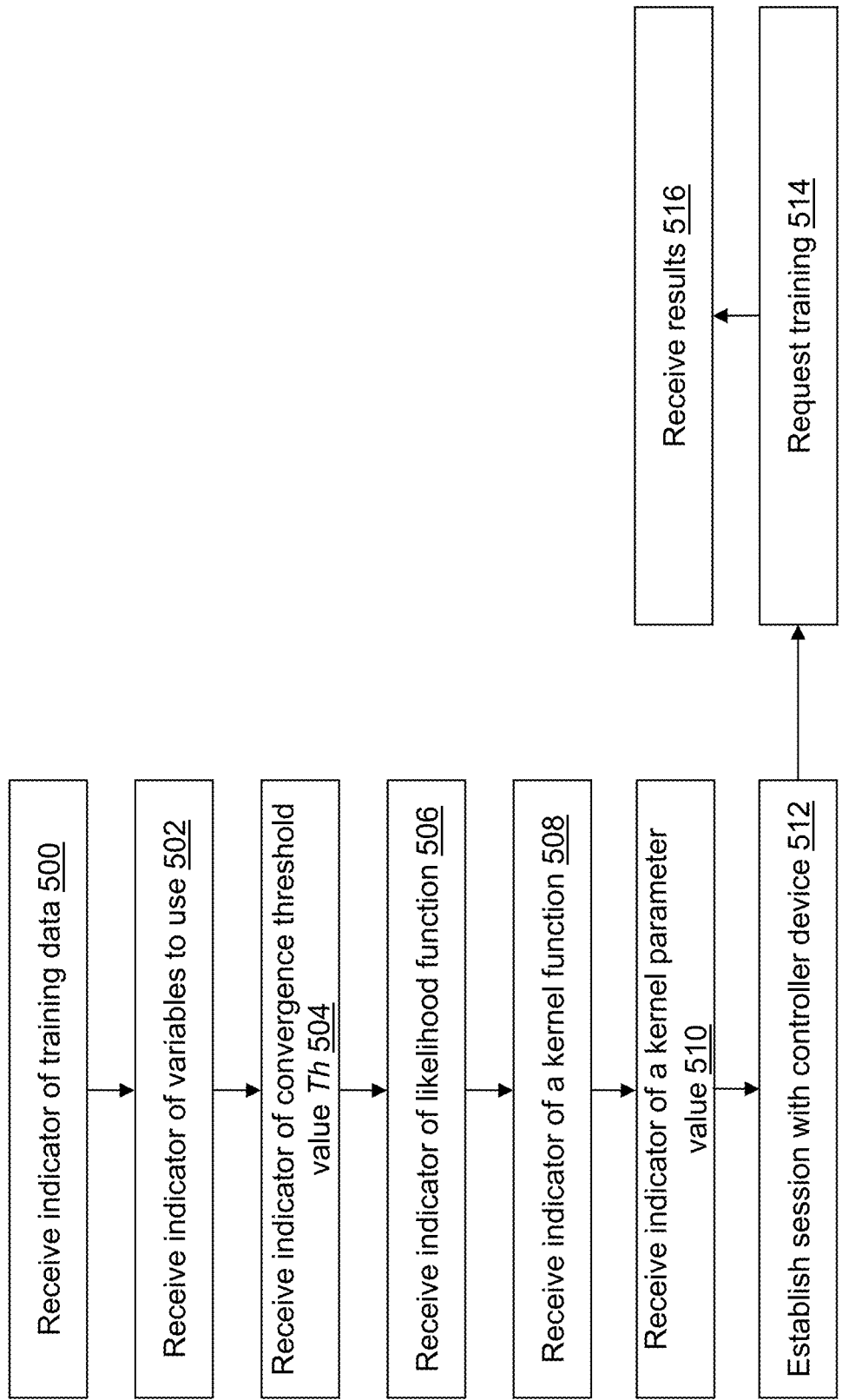
FIG. 5 depicts a flow diagram illustrating examples of operations performed by the user device of FIG. 2 in accordance with an illustrative embodiment.

Referring to FIG. 5, example operations associated with classification model training application 222 are described. Additional, fewer, or different operations may be performed depending on the embodiment of classification model training application 222. The order of presentation of the operations of FIG. 5 is not intended to be limiting. Some of the operations may not be performed in some embodiments. Although some of the operational flows are presented in sequence, the various operations may be performed in various repetitions and/or in other orders than those that are illustrated. For example, a user may execute classification model training application 222, which causes presentation of a first user interface window, which may include a plurality of menus and selectors such as drop-down menus, buttons, text boxes, hyperlinks, etc. associated with classification model training application 222 as understood by a person of skill in the art. The plurality of menus and selectors may be accessed in various orders. An indicator may indicate one or more user trainings from a user interface, one or more data entries into a data field of the user interface, one or more data items read from computer-readable medium 208 or otherwise defined with one or more default values, etc. that are received as an input by classification model training application 222.

In an operation 500, a first indicator may be received that indicates training data 314. For example, the first indicator indicates a location and a name of training data 314. As an example, the first indicator may be received by classification model training application 222 after selection from a user interface window or after entry by a user into a user interface window. In an alternative embodiment, training data 314 may not be selectable. For example, a most recently created dataset may be used automatically.

In an operation 502, a second indicator may be received that indicates the plurality of variables to use in training data 314. For example, the second indicator may indicate one or more column numbers or one or more column names. As another option, all of the columns of training data 314 except a first or a last column may be assumed to be the plurality of variables. The plurality of variables are the variables that define each observation vector $x_i$. The first column, the last column, or another column may further be indicated as the target variable value $y_i$ associated with a respective $i^{th}$ observation vector.

In an operation 504, a third indicator of a convergence threshold value Th may be received. As an example, the third indicator may be received by classification model training application 222 after selection from a user interface window or after entry by a user into a user interface window. In an alternative embodiment, the third indicator may not be received. For example, a default value may be stored, for example, in computer-readable medium 208 and used automatically. In another alternative embodiment, the value of the convergence threshold value Th may not be selectable. Instead, a fixed, predefined value may be used. For illustration, a default value of the convergence threshold value Th may be 0.000001 though other values may be used.

In an operation 506, a fourth indicator of a likelihood function l(x) may be received. For example, the fourth indicator indicates a name of a likelihood function. For illustration, the likelihood function l(x) may be a sigmoid function. The fourth indicator may be received by classification model training application 222 after selection from a user interface window or after entry by a user into a user interface window. A default value for the likelihood function may further be stored, for example, in computer-readable medium 208. As an example, a likelihood function may be selected from "Logit", "Probit", etc. For example, a default likelihood function may be the Logit function. Of course, the likelihood function may be labeled or selected in a variety of different manners by the user as understood by a person of skill in the art. In an alternative embodiment, the likelihood function may not be selectable, and a single likelihood function is implemented in classification model training application 222. For example, the Logit function may be used by default or without allowing a selection. The Logit function may be defined as $$l(x) = \frac{1}{1+e^{-x}}.$$

The Probit function computes a $\tau^{th}$ quantile from a standard normal distribution $N(\tau|0,1)$ and may be defined as $$l(x) = \int_{-\infty}^{x} \mathcal{N}(\tau \mid 0, 1) d\tau,$$

where the predefined likelihood function computes a probability that the observation vector x is less than or equal to a $\tau^{th}$ quantile of the standard normal distribution.

In an operation 508, a fifth indicator of a kernel function may be received. For example, the fifth indicator indicates a name of a kernel function. The fifth indicator may be received by classification model training application 222 after selection from a user interface window or after entry by a user into a user interface window. A default value for the kernel function may further be stored, for example, in computer-readable medium 208. As an example, a kernel function may be selected from "Gaussian", "Exponential", "Linear", "Polynomial", "Matern", "Periodic", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification model training application 222. For example, the Gaussian kernel function may be used by default or without allowing a selection. The Gaussian kernel function may be defined as:

$$\exp\left(\frac{-\|x_i - x_j\|^2}{2s^2}\right)$$

where s is a kernel parameter that is termed a Gaussian bandwidth parameter.

In an operation 510, a sixth indicator of a kernel parameter value to use with the kernel function may be received. For example, a value for s, the Gaussian bandwidth parameter, may be received for the Gaussian kernel function. In an alternative embodiment, the sixth indicator may not be received. For example, a default value for the kernel parameter value may be stored, for example, in computer-readable medium 208 and used automatically or the kernel parameter value may not be used. In another alternative embodiment, the value of the kernel parameter may not be selectable. Instead, a fixed, predefined value may be used.

In an operation 512, a session is established with controller device 104 when user device 200 and controller device 104 are not integrated. User device 200 accepts commands from a user and relays instructions to controller device 104 when user device 200 and controller device 104 are not integrated. Controller device 104 establishes a communication network with the worker devices of worker system 106, sending instructions to each worker device 400 of worker system 106, collecting and aggregating the results of computations from each worker device 400 of worker system 106, and communicating final results to user device 200.

In an operation 514, training of the classification model is requested. When controller device 104 and user device 200 are integrated in the same computing device, training is initiated as described further referring to FIG. 6. The request may include zero or more of the values defined for the parameters indicated in operations 500 to 510 or zero or more of the values may be stored in a memory location known to controller device 104 when controller device 104 and user device 200 are not integrated in the same computing device.

In an operation 516, results may be received from controller device 104 when controller device 104 and user device 200 are not integrated in the same computing device. As another example, an indicator may be received that indicates that the training process is complete. For example, one or more output tables may be presented on display 216 when the training process is complete. As another option, display 216 may present a statement indicating that the training process is complete. The user can access the output tables in a predefined location. Illustrative results may include a posterior latent function also referred to as global latent function $f_g$.

Figure 6:
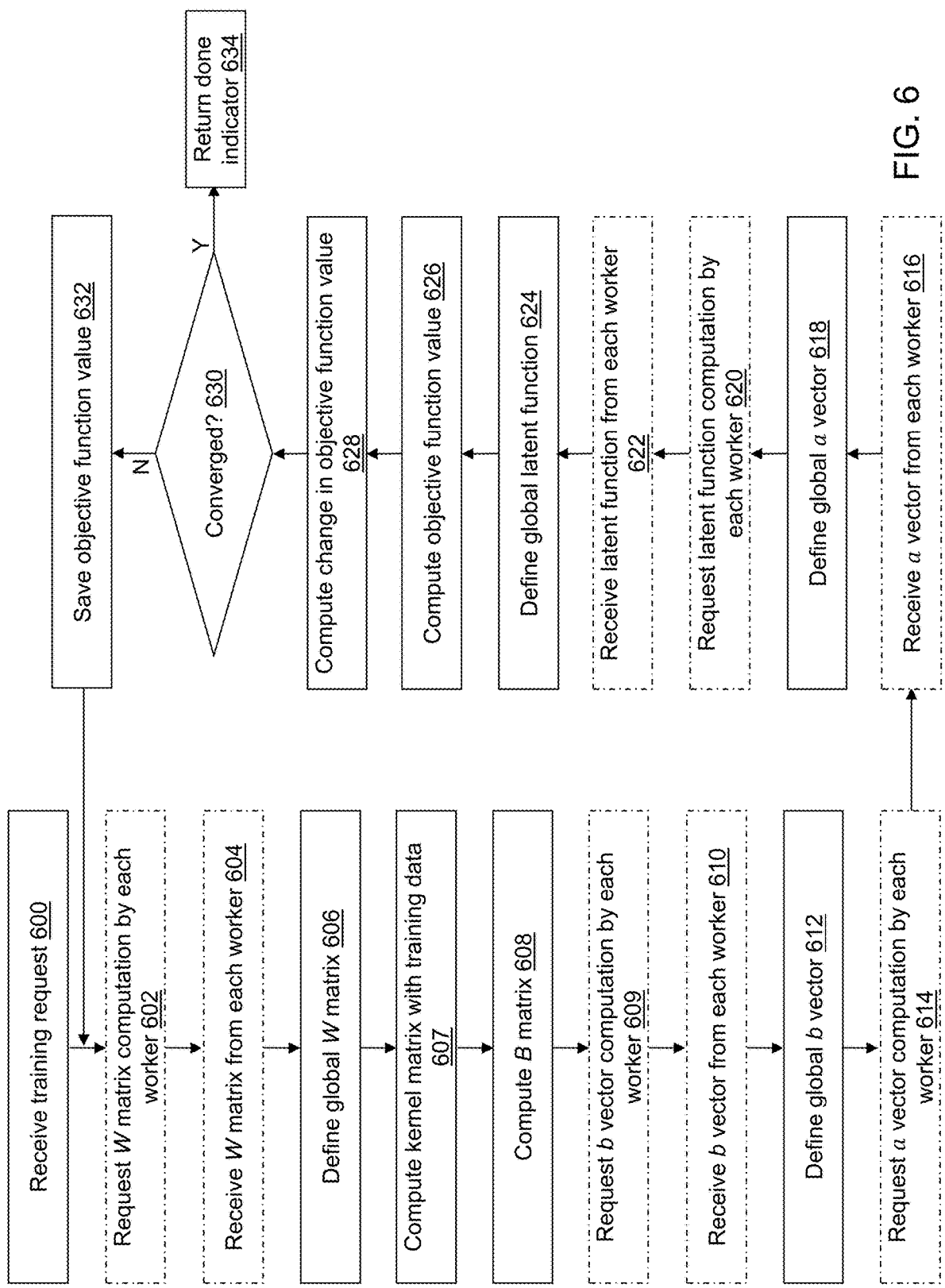
FIG. 6 depicts a flow diagram illustrating examples of operations performed by the controller device of FIG. 3 in accordance with an illustrative embodiment.

Referring to FIG. 6, example operations associated with controller application 312 are described. Additional, fewer, or different operations may be performed depending on the embodiment. The order of presentation of the operations of FIG. 6 is not intended to be limiting. Again, controller application 312 and classification model training application 222 may be integrated or be the same applications so that the operations of FIGS. 5 and 6 are merged.

In an operation 600, the training request may be received from user device 200 or directly from the user of user device 200 when controller device 104 and user device 200 are integrated in the same computing device. Values for the parameters indicated in operations 500 to 510 may be received from user device 200 or directly from the user of user device 200 when integrated or read from a known storage location. A previous objective function value $C_p$ and a global latent function $f_g$ may be initialized to zero prior to operation 602.

In an operation 602, a request is sent to each worker device 400 of worker system 106 to compute a $W_w$ matrix using training data 314 and training data subset 416 distributed to each worker device 400, where the subscript w indicates an index to the respective worker device 400. W is a number of worker computing devices of worker system 106. When controller device 104 is included as a worker device, W is incremented using W=W+1 to indicate that the values computed by controller device 104 are included below. The request is sent by a controller thread of controller device 104. Processing by each worker device 400 is described in FIG. 7A.

In an operation 604, the $W_w$ matrix is received from each worker device 400 of worker system 106. The values are received by the controller thread of controller device 104.

In an operation 606, a global $W_g$ matrix is defined by concatenating the $W_w$ matrix received from each worker device 400 in the order defined by training data 314 so that each row of the global $W_g$ matrix corresponds to an observation vector read from training data 314 in the order stored in training data 314. For example, $W_g=W_i$, i=1, 2, . . . , $N_w$.

In operation 607, the kernel matrix K is computed using the observation vectors read from training data 314 with the kernel function and kernel parameter value. Kernel matrix K is an N×N matrix, where N is a number of observation vectors included in training data 314.

In an operation 608, the B matrix is computed for observations included in training data 314 using, for example, $B=W_g^{0.5}KW_g^{0.5}$.

In an operation 609, a request is sent to each worker device 400 of worker system 106 to compute a $b_w$ vector using training data 314 and training data subset 416 distributed to each worker device 400, where the subscript w indicates an index to the respective worker device 400. The request is sent by a controller thread of controller device 104. Processing by each worker device 400 is described in FIG. 7B.

In an operation 610, the $b_w$ vector is received from each worker device 400 of worker system 106. The values are received by the controller thread of controller device 104.

In an operation 612, a global $b_g$ vector is created by concatenating the $b_w$ vector received from each worker device 400 in the order defined by training data 314 so that each entry of the global $b_w$ vector corresponds to an observation vector read from training data 314 in the order stored in training data 314. For example, $b_g=b_i$, i=1, 2, . . . , $N_w$.

In an operation 614, a request is sent to each worker device 400 of worker system 106 to compute an $a_w$ vector using training data 314 and training data subset 416 distributed to each worker device 400, where the subscript w indicates an index to the respective worker device 400. The request is sent by a controller thread of controller device 104. Processing by each worker device 400 is described in FIG. 7C.

In an operation 616, the $a_w$ vector is received from each worker device 400 of worker system 106. The values are received by the controller thread of controller device 104.

In an operation 618, a global $a_g$ vector is created by concatenating the $a_w$ vector received from each worker device 400 in the order defined by training data 314 so that each entry of the global $a_w$ vector corresponds to an observation vector read from training data 314 in the order stored in training data 314. For example, $a_g=a_i$, i=1, 2, . . . , $N_w$.

In an operation 620, a request is sent to each worker device 400 of worker system 106 to compute a latent function vector $f_w$ using training data 314 and training data subset 416 distributed to each worker device 400, where the subscript w indicates an index to the respective worker device 400. The request is sent by a controller thread of controller device 104. Processing by each worker device 400 is described in FIG. 7C.

In an operation 622, the latent function vector $f_w$ is received from each worker device 400 of worker system 106. The values are received by the controller thread of controller device 104.

In an operation 624, a global latent function $f_g$ is created by concatenating the latent function vector $f_w$ received from each worker device 400 in the order defined by training data 314 so that each entry of the latent function vector $f_w$ corresponds to an observation vector read from training data 314 in the order stored in training data 314. For example, $f_g=f_i$, i=1, 2, . . . , $N_w$.

In an operation 626, an objective function value is computed, for example, using $C=-0.5a_g^T f_g + \log l(x_i)$, i=1, 2, . . . , N, where T indicates a transpose and $l(x_i)$ is a likelihood function value computed for an $i^{th}$ observation vector $x_i$, and N is a number of observation vectors included in training data 314. For example, $l(x_i)=$ $$\frac{1}{1+e^{-x_i}}.$$

In an alternative embodiment, each worker device 400 can compute values for $C_w$ based on the observation vectors included in training data subset 416 allocated to the respective worker device 400 with controller device 104 concatenating the $C_w$, for example, using $C=C_i$, i=1, 2, . . . , $N_w$.

In an operation 628, a change in the objective function value $\Delta C$ is computed, for example, using $\Delta C=|C-C_p|$.

In an operation 630, a determination is made concerning whether $\Delta C<Th$ such that the computations have converged. If $\Delta C<Th$, processing continues in an operation 634 to indicate convergence has been achieved. If $\Delta C \geq Th$, processing continues in an operation 632. In addition, or in the alternative, a number of iterations of operation 628 may be used to determine that processing is complete.

In operation 632, $C_p$ is updated for a next iteration using $C_p=C$, and processing continues in operation 602.

In operation 634, the global latent function $f_g$, which is also referred to as the posterior function, are output. For example, global latent function $f_g$ may be output to classification model description 224, and an indicator sent to user device 200 indicating that model training is complete. The kernel function indicator, kernel parameter indicator, and likelihood function indicator further may be output to classification model description 224. Training data 314 further may be output to classification model description 224.

Referring to FIGS. 7A, 7B, 7C, and 7D, example operations associated with worker application 412 are described. Additional, fewer, or different operations may be performed depending on the embodiment. The order of presentation of the operations of FIGS. 7A, 7B, 7C, and 7D is not intended to be limiting. When controller device 104 is acting as a worker device, controller device 104 also executes the operations of FIGS. 7A, 7B, 7C, and 7D with an assigned training data subset 416 and training data 314.

Figure 7B:
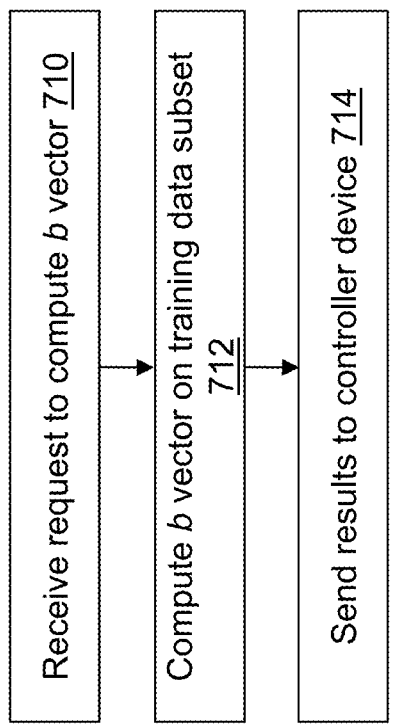
FIGS. 7A to 7D depict flow diagrams illustrating examples of operations performed by the worker device of FIG. 4 in accordance with an illustrative embodiment.
Figure 7A:
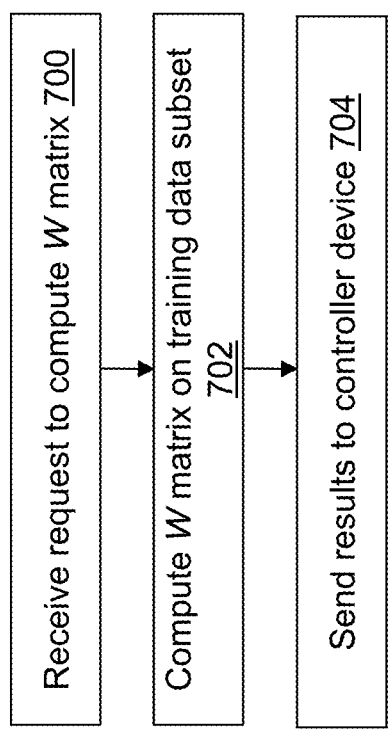

Referring to FIG. 7A, in an operation 700, the request to compute $W_w$ matrix is received from controller device 104 as a result of operation 602. The request may include the likelihood function indicator or the indicator value may be otherwise provided to each worker in a known memory location or based on a default value. Training data 314 and training data subset 416 are stored on each worker device 400.

In operation 702, the $W_w$ matrix is computed for observations included in training data subset 416 allocated to the respective worker device 400 using, for example, $W_w = -\nabla\nabla \log l(x_i)$, i=1, 2, . . . , $N_{ow}$, where $\nabla\nabla$ indicates a Laplacian, which is a second order derivative matrix of a logarithm of the likelihood function, $l(x_i)$ is a likelihood function value computed for an $i^{th}$ observation vector $x_i$, and $N_{ow}$ is a number of observation vectors included in training data subset 416 allocated to the respective worker device 400. The $W_w$ matrix is an $N_{ow} \times N_{ow}$ diagonal matrix that may optionally be stored as a vector with an entry for each observation included in training data subset 416 allocated to the respective worker device 400. For example, $\nabla\nabla \log l(x_i) = -\pi(1-\pi)$, when $$l(x_i) = \frac{1}{1+e^{-x_i}}.$$

In an operation 704, $W_w$ is sent from each worker device 400 of worker system 106 to controller device 104, and processing continues in operation 604 of FIG. 6.

Referring to FIG. 7B, in an operation 710, the request to compute the $b_w$ vector is received from controller device 104 as a result of operation 609. The request may include $W_g$ and $f_g$ or $W_g$ and $f_g$ may be otherwise provided to each worker in a known memory location or based on a default value.

In operation 712, the $b_w$ vector is computed for observations included in training data subset 416 allocated to the respective worker device 400 using, for example, $b_w = W_w f_w + \nabla \log l(x_i)$, $i=1, 2, \ldots, N_{ow}$, where $\nabla$ indicates a first derivative of a logarithm of the likelihood function, $l(x_i)$ is a likelihood function value computed for an $i^{th}$ observation vector $x_i$, and $N_{ow}$ is a number of observation vectors included in training data subset 416 allocated to the respective worker device 400. For example, $\nabla \log l(x_i) = (x_i - \pi)$, when $$l(x_i) = \frac{1}{1 + e^{-x_i}}.$$

In operation 714, the $b_w$ vector is sent from each worker device 400 of worker system 106 to controller device 104, and processing continues in operation 610 of FIG. 6.

Figure 7D:
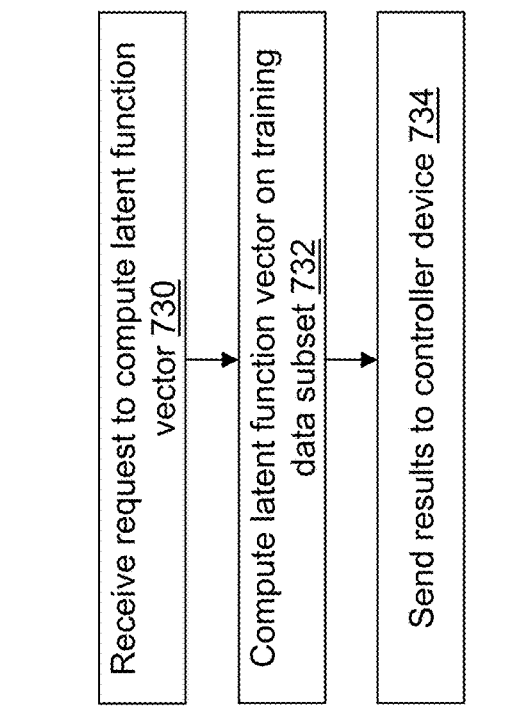
Figure 7C:
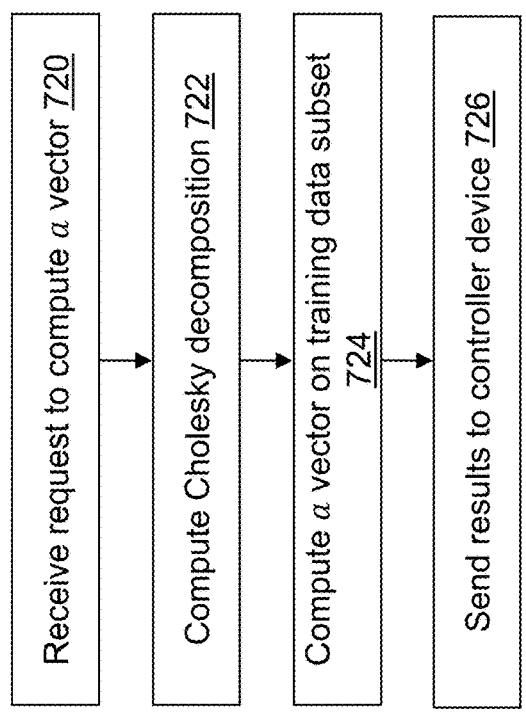

Referring to FIG. 7C, in an operation 720, the request to compute the $a_w$ vector is received from controller device 104 as a result of operation 614. The request may include $b_g$, $B_g$, and K or $b_g$, $B_g$, and K may be otherwise provided to each worker in a known memory location or based on a default value.

In operation 722, a Cholesky decomposition L is computed for observations included in training data 314 using, for example, $L = \text{cholesky}(I + B_g)$, where L is an N×N matrix, and I is an N×N diagonal identity matrix.

In operation 724, the $a_w$ vector is computed for observations included in training data 314 using, for example, $a = b_g - W_g^{0.5} L^T \backslash (L \backslash (W_g^{0.5} K b_g))$, where T indicates a transpose. The $a_w$ vector includes the $N_w$ entries of a that are associated with the training data subset 416 allocated to the respective worker device 400.

In operation 726, the $a_w$ vector is sent from each worker device 400 of worker system 106 to controller device 104, and processing continues in operation 616 of FIG. 6.

Referring to FIG. 7D, in an operation 730, the request to compute a latent function vector $f_w$ is received from controller device 104 as a result of operation 620. The request may include $a_g$ or $a_g$ may be otherwise provided to each worker in a known memory location or based on a default value.

In operation 732, the latent function vector $f_w$ is computed for observations included in training data 314 using, for example, $f = K a_g$. The latent function vector $f_w$ includes the $N_w$ entries of $f$ that are associated with the training data subset 416 allocated to the respective worker device 400.

In operation 734, the latent function vector $f_w$ is sent from each worker device 400 of worker system 106 to controller device 104, and processing continues in operation 622 of FIG. 6.

The operations of FIGS. 5, 6, and 7A to 7D result in a trained classification model. Information describing the trained classification model is stored in classification model description 224 by either or both of user device 200 or controller device 104.

Figure 8:
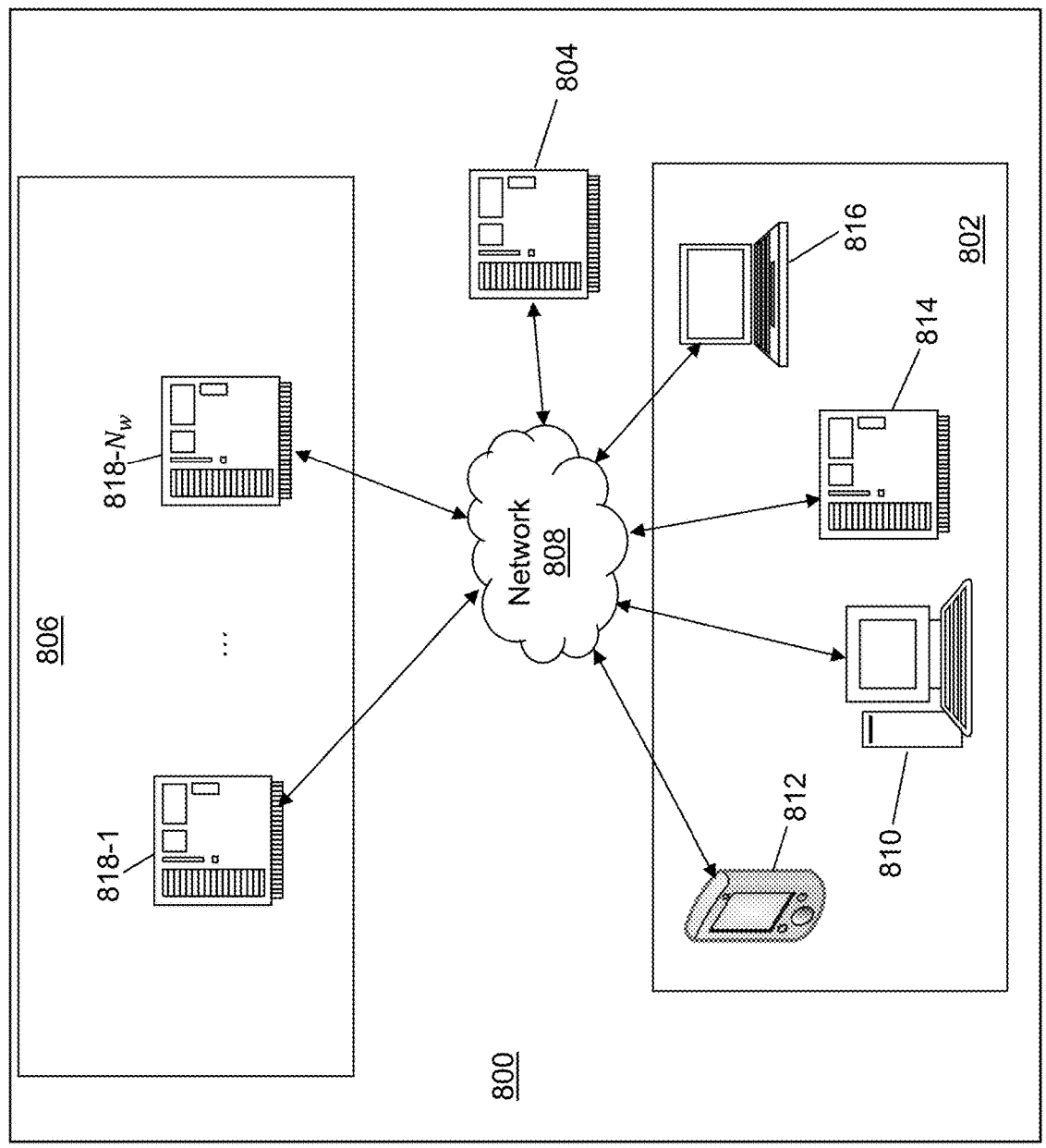
FIG. 8 depicts a block diagram of a classification system in accordance with an illustrative embodiment.

Referring to FIG. 8, a block diagram of a classification system 800 is shown in accordance with an illustrative embodiment. In an illustrative embodiment, classification system 800 may include a second user system 802, a second controller device 804, a second worker system 806, and a second network 808. Classification system 800 uses the trained classification model stored in classification model description 224 to classify data stored in input data that is distributed across second worker system 806. Classification system 800 and classification model training system 100 may be composed of the same computing devices or otherwise integrated into a single system or may be distinct systems.

Each of second user system 802, second controller device 804, and second worker system 806 may be composed of one or more discrete computing devices in communication through second network 808. Second user system 802 and second controller device 804 may be integrated into a single computing device.

Second network 808 may include one or more networks of the same or different types. Second network 808 can be any type of wired and/or wireless public or private network including a cellular network, a local area network, a wide area network such as the Internet or the World Wide Web, etc. Second network 808 further may comprise sub-networks and consist of any number of communication devices.

The one or more computing devices of second user system 802 may include computing devices of any form factor such as a desktop 810, a smart phone 812, a server computer 814, a laptop 816, a personal digital assistant, an integrated messaging device, a tablet computer, etc. Second user system 802 can include any number and any combination of form factors of computing devices that may be organized into subnets. The computing devices of second user system 802 may send and receive signals through second network 808 to/from another of the one or more computing devices of second user system 802 and/or to/from second controller device 804. The one or more computing devices of second user system 802 may communicate using various transmission media that may be wired and/or wireless as understood by those skilled in the art. The one or more computing devices of second user system 802 may be geographically dispersed from each other and/or co-located.

Figure 9:
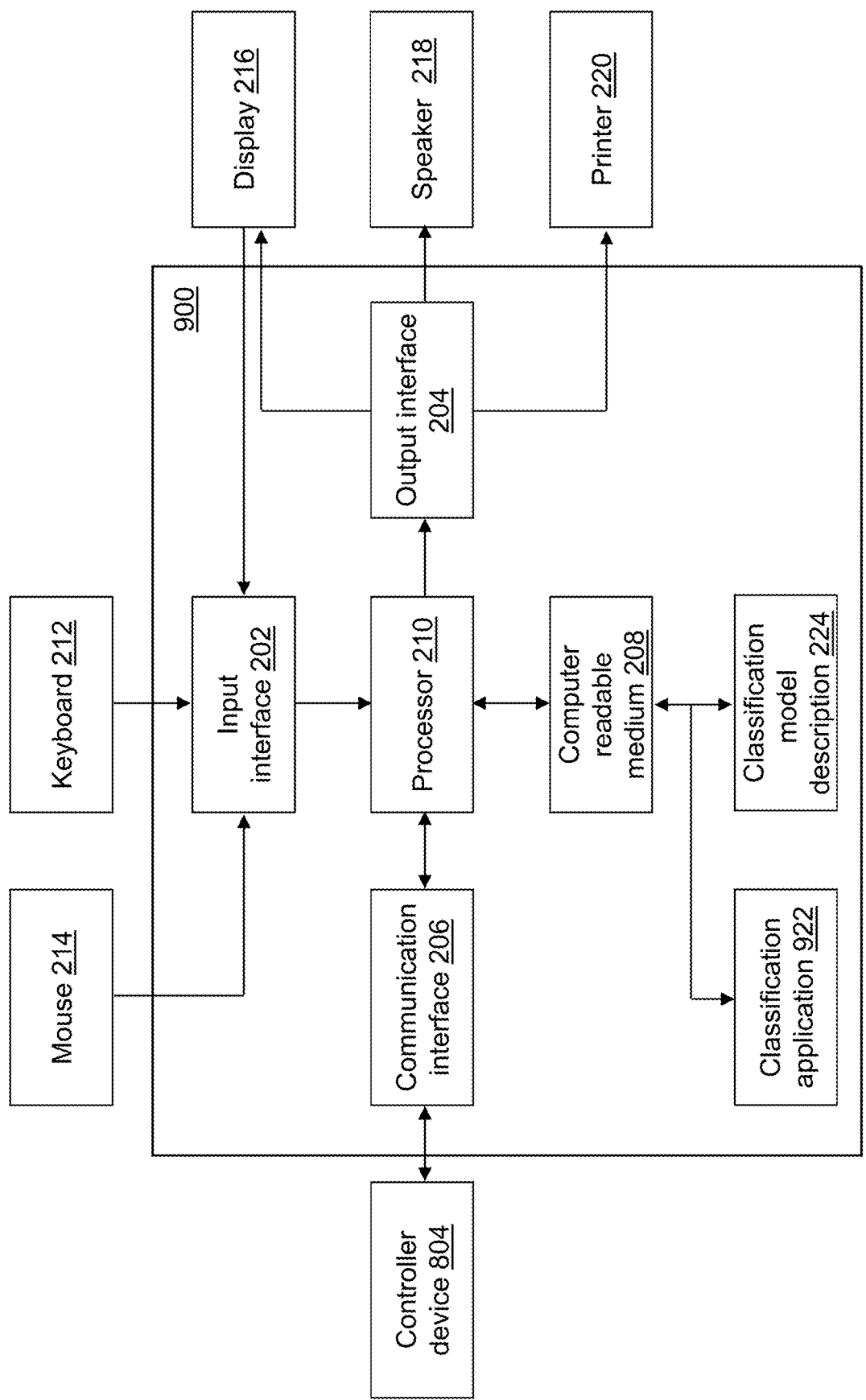
FIG. 9 depicts a block diagram of a user device of the classification system of FIG. 8 in accordance with an illustrative embodiment.

For illustration, referring to FIG. 9, a block diagram of a second user device 900 is shown in accordance with an example embodiment. Second user device 900 is an example computing device of second user system 802. For example, each of desktop 810, smart phone 812, server computer 814, and laptop 816 may be an instance of second user device 900. Similar to user device 200, second user device 900 may include input interface 202, output interface 204, communication interface 206, non-transitory computer-readable medium 208, processor 280, a classification application 922, and classification model description 224. Each computing device of second user system 802 may be executing classification application 922 of the same or different type. Second user device 900 may execute classification application 922 that triggers creation of classification output data for the input data.

Referring again to FIG. 8, second controller device 804 can include any form factor of computing device. For illustration, FIG. 8 represents second controller device 804 as a server computer. Second controller device 804 may send and receive signals through second network 808 to/from second user system 802 and/or to/from second worker system 806. Second controller device 804 may communicate using various transmission media that may be wired and/or wireless as understood by those skilled in the art. Second controller device 804 may be implemented on a plurality of computing devices of the same or different type. Classification system 800 further may include a plurality of controller devices.

Figure 10:
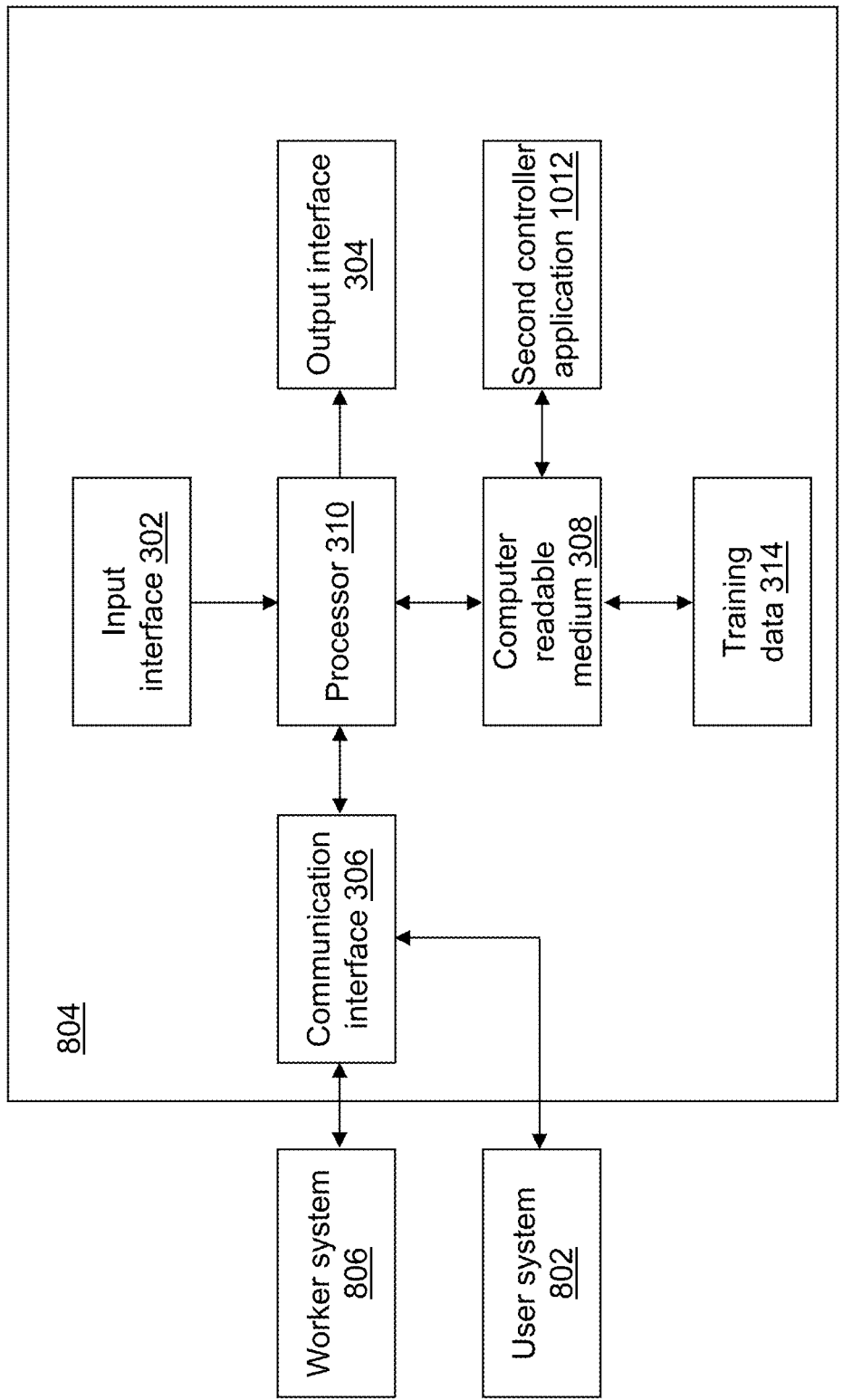
FIG. 10 depicts a block diagram of a controller device of the classification system of FIG. 8 in accordance with an illustrative embodiment.

For illustration, referring to FIG. 10, a block diagram of second controller device 804 is shown in accordance with an illustrative embodiment. Similar to controller device 104, second controller device 804 may include second input interface 302, second output interface 304, second communication interface 306, second computer-readable medium 308, second processor 380, a second controller application 1012, and training data 314.

Referring again to FIG. 8, the one or more computing devices of second worker system 806 may include computers of any form factor such as a desktop, a server, a laptop, etc. For example, in the illustrative embodiment, second worker system 806 includes a first server computer 818-1, . . . , and a $N_w^{th}$ server computer 818-$N_w$. Each server computer may support use of a plurality of threads. The computing devices of second worker system 806 may send and receive signals through second network 808 to/from second controller device 804 and/or to/from another computing device of second worker system 806. The one or more computing devices of second worker system 806 may be geographically dispersed from each other and/or co-located. The one or more computing devices of second worker system 806 may communicate using various transmission media that may be wired and/or wireless as understood by those skilled in the art.

Figure 11:
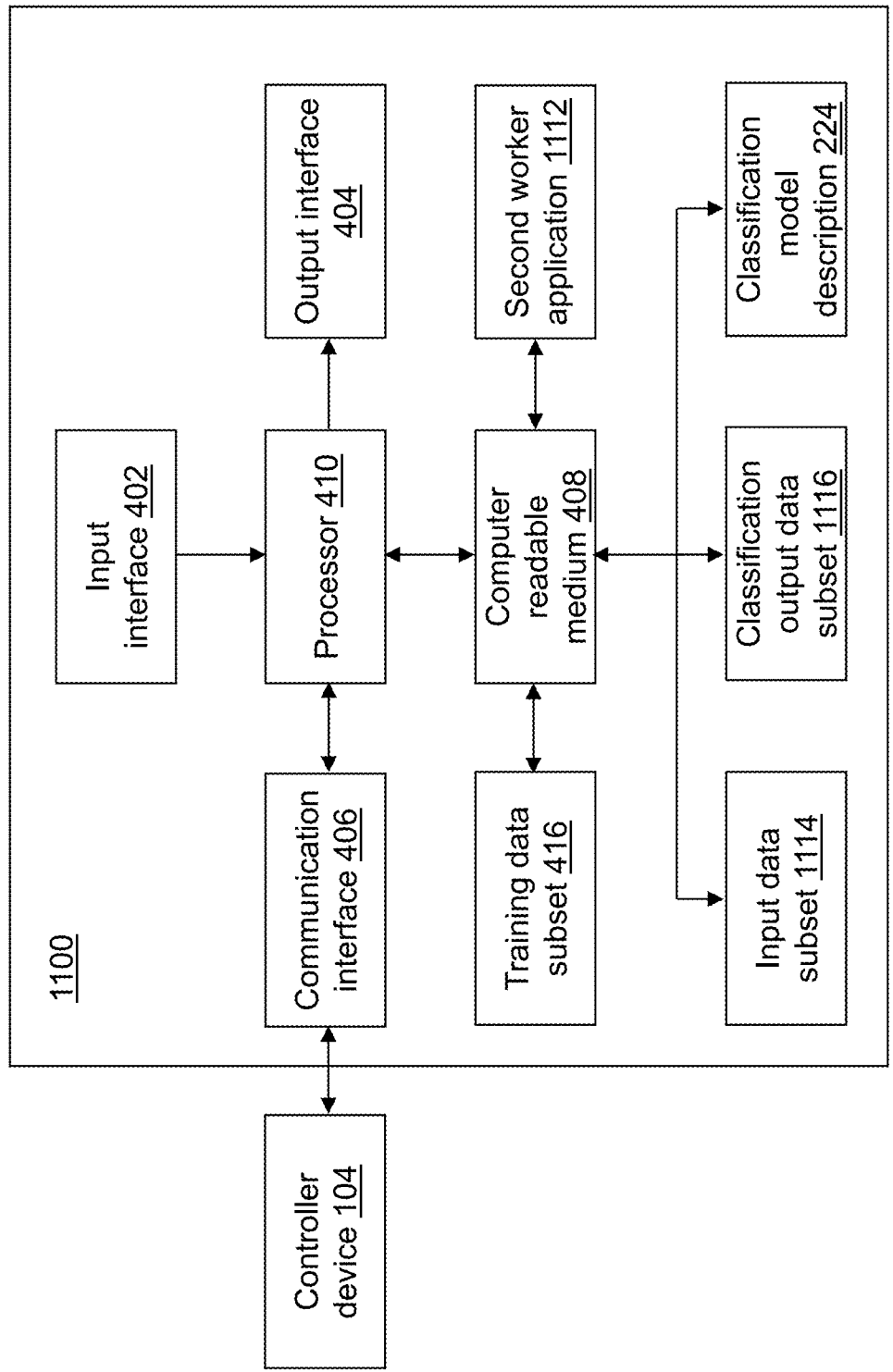
FIG. 11 depicts a block diagram of a worker device of the classification system of FIG. 8 in accordance with an illustrative embodiment.

For illustration, referring to FIG. 11, a block diagram of a second worker device 1100 is shown in accordance with an example embodiment. Second worker device 1100 is an example computing device of second worker system 806. For example, each of first server computer 818-1, . . . , and $N_w^{th}$ server computer 818-$N_w$ may be an instance of second worker device 1100. Similar to worker device 400, second worker device 1100 may include third input interface 402, third output interface 404, third communication interface 406, third computer-readable medium 408, third processor 480, a second worker application 1112, an input data subset 1114, a classification output data subset 1116, and training data subset 416. The input data may be distributed into input data subset 1114 distributed across each second worker device 1100 of second worker system 806. In an alternative embodiment, second controller device 804 may also be used to perform the operations described for each second worker device 1100 with a portion of the input data distributed to second controller device 804.

Referring again to FIG. 9, each second user device 900 of second user system 802 may include the same or different components and combinations of Classification application 922 performs operations associated with classifying observations included in data stored in the input data distributed into input data subset 1114 stored on each second worker device 1100 of second worker system 806. The classification for each observation vector may be stored in a respective classification output data subset 1116. Data describing the trained classification model may be read from classification model description 224 and used to determine each classification. Some or all of the operations described herein may be embodied in classification application 922. The operations may be implemented using hardware, firmware, software, or any combination of these methods.

Referring to the example embodiment of FIG. 9, classification application 922 is implemented in software (comprised of computer-readable and/or computer-executable instructions) stored in computer-readable medium 208 and accessible by processor 280 for execution of the instructions that embody the operations of classification application 922. Classification application 922 may be written using one or more programming languages, assembly languages, scripting languages, etc. Classification application 922 may be implemented as a Web application.

Classification application 922 may be integrated with other analytic tools. As an example, classification application 922 may be part of an integrated data analytics software application and/or software architecture such as that offered by SAS Institute Inc. of Cary, N.C., USA. Merely for illustration, classification application 922 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® CAS, SAS/OR®, SAS/ETS®, SAS® Visual Analytics, SAS® Viya™, SAS In-Memory Statistics for Hadoop®, etc.

Referring to FIG. 10, fewer, different, or additional components may be incorporated into second controller device 804. Second controller application 1012 performs operations associated with coordinating the classification based on inputs provided from second user device 900 using the computing devices of second worker system 806. The operations may be implemented using hardware, firmware, software, or any combination of these methods. Referring to the example embodiment of FIG. 10, second controller application 1012 is implemented in software (comprised of computer-readable and/or computer-executable instructions) stored in second computer-readable medium 308 and accessible by second processor 380 for execution of the instructions that embody the operations of second controller application 1012. Second controller application 1012 may be written using one or more programming languages, assembly languages, scripting languages, etc. Second controller application 1012 may be implemented as a Web application.

Second controller application 1012 may be integrated with other analytic tools. As an example, second controller application 1012 may be part of an integrated data analytics software application and/or software architecture. For example, second controller application 1012 may be part of SAS® CAS. Merely for further illustration, second controller application 1012 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®.

Referring to FIG. 11, fewer, different, and additional components may be incorporated into second worker device 1100. Each second worker device 1100 of second worker system 806 may include the same or different components or combination of components. Second worker application 1112 may be integrated with other analytic tools. As an example, second worker application 1112 may be part of an integrated data analytics software application and/or software architecture. For example, second worker application 1112 may be part of SAS® CAS. Merely for further illustration, second worker application 1112 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®.

Classification application 922, second controller application 1012, and second worker application 1112 may be the same or different applications that are integrated in various manners to classify or otherwise label data stored in the input data. Classification application 922, second controller application 1012, and second worker application 1112 further may be the same or different applications that are integrated in various manners with classification model training application 222, controller application 312, and worker application 412, respectively.

Similar to training data 314, the input data may include, for example, a plurality of rows and a plurality of columns. The plurality of rows may be referred to as observation vectors or records (observations), and the columns may be referred to as variables. In an alternative embodiment, the input data may be transposed. The plurality of variables define a vector $x_i$ for each observation vector i=8, 2, ..., N, where N is a number of the observation vectors included in the input data. The input data may include additional variables that are not included in the plurality of variables. One or more variables of the plurality of variables may describe a characteristic of a physical object. The observations included in the input data are unlabeled or unclassified.

The input data may include data captured as a function of time for one or more physical objects. The data stored in the input data may be captured at different time points periodically, intermittently, when an event occurs, etc. The input data may include data captured at a high data rate such as 200 or more observation vectors per second for one or more physical objects. One or more columns of the input data may include a time and/or date value. The input data may include data captured under normal and abnormal operating conditions of the physical object.

The data stored in the input data may be received directly or indirectly from the source and may or may not be pre-processed in some manner. For example, the data may be pre-processed using an ESPE. For example, data stored in the input data may be generated as part of the IoT.

The data stored in the input data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The input data may be stored in various compressed formats such as a coordinate format, a compressed sparse column format, a compressed sparse row format, etc. The data may be organized using delimited fields, such as comma or space separated fields, fixed width fields, using a SAS® dataset, etc.

The input data may be stored using various data structures as known to those skilled in the art including one or more files of a file system, a relational database, one or more tables of a system of tables, a structured query language database, etc. on second controller device 804 and/or on second worker system 806. Second controller device 804 may coordinate access to the input data that is distributed across second worker system 806 such that each second worker device 1100 stores a subset of the input data. For example, the input data may be stored in a cube distributed across a grid of computers as understood by a person of skill in the art. As another example, the input data may be stored in a multi-node Hadoop® class. As another example, the input data may be stored in a cloud of computers and accessed using cloud computing technologies, as understood by a person of skill in the art. The SAS® LASR™ Analytic Server may be used as an analytic platform to enable multiple users to concurrently access data stored in the input data. The SAS Viya open, cloud-ready, in-memory architecture also may be used as an analytic platform to enable multiple users to concurrently access data stored in the input data. SAS CAS may be used as an analytic server with associated cloud services in SAS Viya. Some systems may be of other types and configurations.

Figure 12:
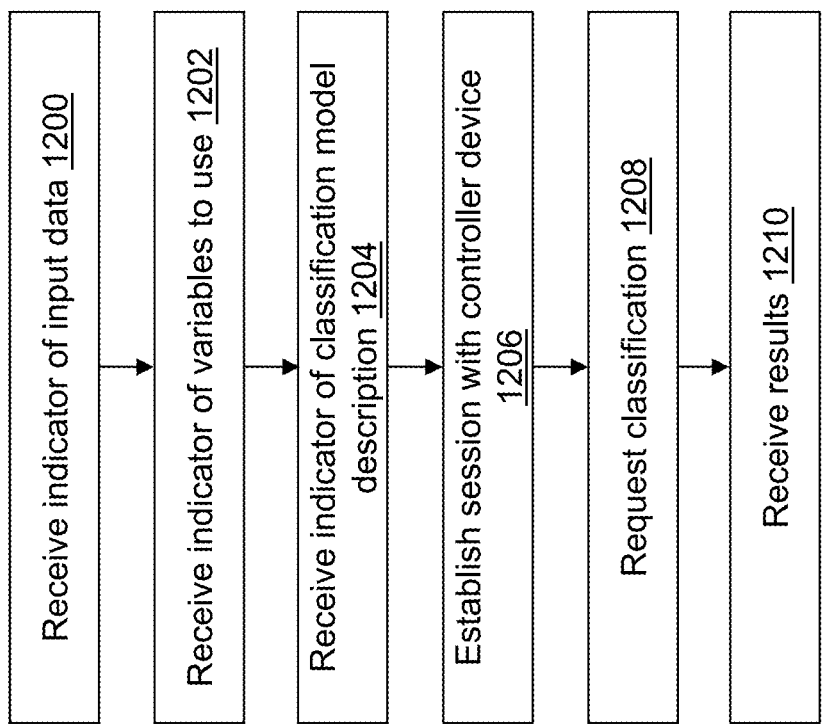
FIG. 12 depicts a flow diagram illustrating examples of operations performed by the user device of FIG. 9 in accordance with an illustrative embodiment.

Referring to FIG. 12, example operations associated with classification application 922 are described. Additional, fewer, or different operations may be performed depending on the embodiment of classification application 922. The order of presentation of the operations of FIG. 12 is not intended to be limiting. Some of the operations may not be performed in some embodiments. Although some of the operational flows are presented in sequence, the various operations may be performed in various repetitions and/or in other orders than those that are illustrated. For example, a user may execute classification application 922, which causes presentation of a first user interface window, which may include a plurality of menus and selectors such as drop-down menus, buttons, text boxes, hyperlinks, etc. associated with classification application 922 as understood by a person of skill in the art. The plurality of menus and selectors may be accessed in various orders.

In an operation 1200, a seventh indicator may be received that indicates the input data. For example, the seventh indicator indicates a location and a name of the input data. As an example, the seventh indicator may be received by classification application 922 after selection from a user interface window or after entry by a user into a user interface window. In an alternative embodiment, the input data may not be selectable. For example, a most recently created dataset may be used automatically.

In an operation 1202, an eighth indicator may be received that indicates the plurality of variables to use in the input data. For example, the eighth indicator may indicate one or more column numbers or one or more column names. As another option, all of the columns of the input data may be assumed to be the plurality of variables. The plurality of variables are the variables that define each observation vector $x_i$.

In an operation 1204, a ninth indicator may be received that indicates classification model description 224. For example, the ninth indicator indicates a location and a name of classification model description 224. As an example, the ninth indicator may be received by classification application 922 after selection from a user interface window or after entry by a user into a user interface window. In an alternative embodiment, classification model description 224 may not be selectable. For example, a classification model description 224 may be stored in a known location and used automatically.

In an operation 1206, a session is established with second controller device 804 when second user device 900 and second controller device 804 are not integrated. Second user device 900 accepts commands from a user and relays instructions to second controller device 804 when second user device 900 and second controller device 804 are not integrated. Second controller device 804 establishes a communication network with the worker devices of second worker system 806, sending instructions to each second worker device 1100 of second worker system 806, collecting and aggregating the results of computations from each second worker device 1100 of second worker system 806, and communicating final results to second user device 900.

In an operation 1208, classification of the input data is requested. When second controller device 804 and second user device 900 are integrated in the same computing device, classification is initiated as described further referring to FIG. 13. The request may include zero or more of the values defined for the parameters indicated in operations 1200 to 1204 or zero or more of the values may be stored in a memory location known to second controller device 804 when second controller device 804 and second user device 900 are not integrated in the same computing device.

In an operation 1210, results may be received from second controller device 804 when second controller device 804 and second user device 900 are not integrated in the same computing device. As another example, an indicator may be received that indicates that the classification process is complete. For example, one or more output tables may be presented on display 216 when the classification process is complete. As another option, display 216 may present a statement indicating that the classification process is complete. The user can access the output tables in a predefined location.

Figure 13:
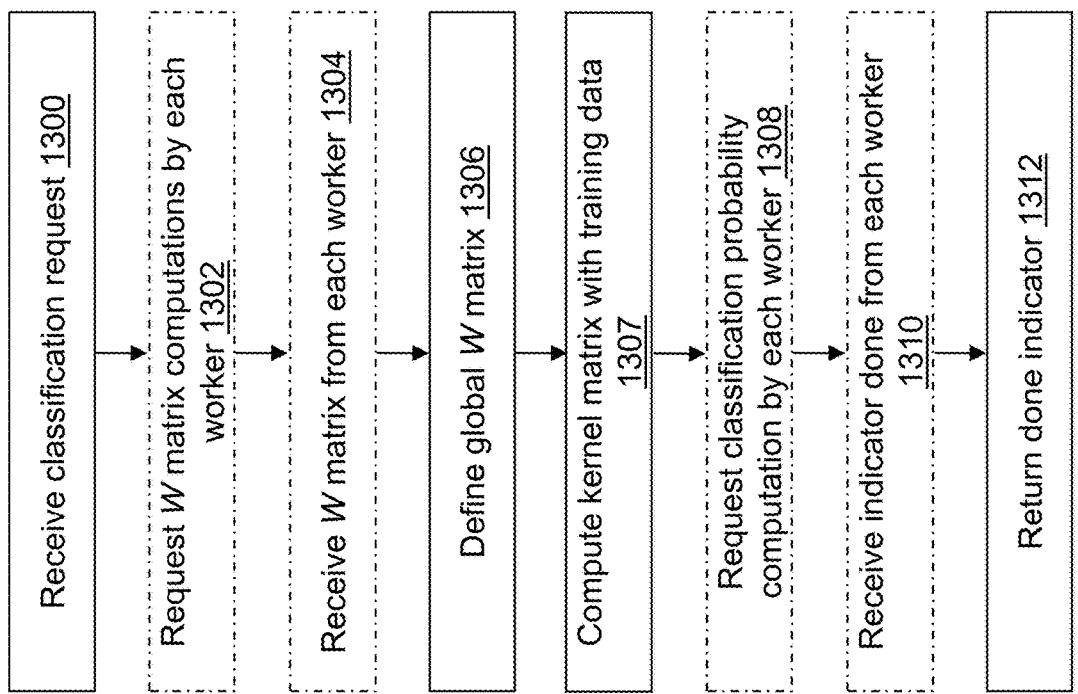
FIG. 13 depicts a flow diagram illustrating examples of operations performed by the controller device of FIG. 10 in accordance with an illustrative embodiment.

Referring to FIG. 13, example operations associated with second controller application 1012 are described. Additional, fewer, or different operations may be performed depending on the embodiment. The order of presentation of the operations of FIG. 13 is not intended to be limiting. Again, second controller application 1012 and classification application 922 may be integrated or be the same applications so that the operations of FIGS. 12 and 13 are merged.

In an operation 1300, the classification request may be received from second user device 900 or directly from the user of second user device 900 when second controller device 804 and second user device 900 are integrated in the same computing device. Values for the parameters indicated in operations 1200 to 1204 may be received from second user device 900 or directly from the user of second user device 900 when integrated or may be read from a known storage location. A global latent function $f_g$ may be initialized to zero prior to operation 1302.

Similar to operation 602, in an operation 1302, a request is sent to each second worker device 1100 of second worker system 806 to compute a $W_w$ matrix using input data subset 1114 distributed to each second worker device 1100, where the subscript w indicates an index to the respective second worker device 1100. $N_w$ is a number of worker computing devices of second worker system 806. When second controller device 804 is included as a worker device, $N_w$ is incremented using $N_w = N_w + 1$ to indicate that the values computed by second controller device 804 are included below. The request is sent by a controller thread of second controller device 804. Processing by each second worker device 1100 is described in FIG. 14A.

Similar to operation 604, in an operation 1304, the $W_w$ matrix is received from each second worker device 1100 of second worker system 806. The values are received by the controller thread of second controller device 804.

Similar to operation 606, in an operation 1306, a global $W_g$ matrix is created by concatenating the $W_w$ matrix and $B_w$ matrix received from each second worker device 1100 in the order defined by the input data so that each row of the global $W_g$ matrix and the global $B_g$ matrix corresponds to an observation vector read from the input data in the order stored in the input data. For example, $W_g = W_i$, i=1, 2, ..., $N_w$.

Similar to operation 607, in an operation 1307, a kernel matrix K is computed using the observation vectors read from training data 314 with the kernel function and kernel parameter value. Kernel matrix K is an $N_t \times N_t$ matrix, where $N_t$ is a number of observation vectors included in training data 314.

In an operation 1308, a request is sent to each second worker device 1100 of second worker system 806 to compute a classification probability for each observation vector stored in input data subset 1114 distributed to each second worker device 1100. The request is sent by a controller thread of second controller device 804. Processing by each second worker device 1100 is described in FIG. 14B.

In an operation 1310, an indicator is received from each second worker device 1100 of second worker system 806 indicating that the classification probability has been computed for each observation vector stored in input data subset 1114.

In an operation 1312, a done indicator is sent to second user device 900 indicating that the classification process is complete.

Referring to FIGS. 14A and 14B, example operations associated with second worker application 1112 are described. Additional, fewer, or different operations may be performed depending on the embodiment. The order of presentation of the operations of FIGS. 14A and 14B is not intended to be limiting. When second controller device 804 is acting as a worker device second controller device 804 also executes the operations of FIGS. 14A and 14B with an assigned input data subset 1114.

Referring to FIG. 14A, in an operation 1400, the request to compute the $W_w$ matrix is received from second controller device 804 as a result of operation 1302. The request may include the likelihood function indicator read from classification model description 224 and provided by second user device 900 or it may be otherwise provided to each worker in a known memory location or based on a default value.

Similar to operation 702, in an operation 1402, the $W_w$ matrix is computed for observations included in training data subset 416 allocated to the respective second worker device 1100 using, for example, $W_w = -\nabla\nabla \log l(x_i)$, i=1, 2, ..., $N_{ow}$, where $\nabla\nabla$ indicates a Laplacian, which is a second order derivative matrix of a logarithm of the likelihood function, $l(x_i)$ is a likelihood function value computed for an $i^{th}$ observation vector $x_i$, and $N_{ow}$ is a number of observation vectors included in training data subset 416 allocated to the respective worker device 1100. The $W_w$ matrix is an $N_{ow} \times N_{ow}$ diagonal matrix that may optionally be stored as a vector with an entry for each observation included in training data subset 416 allocated to the respective worker device 400. For example, $\nabla\nabla \log l(x_i) = -\pi(1-\pi)$, when $$l(x_i) = \frac{1}{1+e^{-x}}.$$

In operation 1404, $W_w$ is sent from each second worker device 1100 of second worker system 806 to second controller device 804, and processing continues in operation 1304 of FIG. 13.

Referring to FIG. 14B, in an operation 1410, the request to compute the classification probability is received from second controller device 804 as a result of operation 1308. The request may include $W_g$ and K or $W_g$ and K may be otherwise provided to each worker in a known memory location or based on a default value.

In an operation 1412, a Cholesky decomposition L is computed for observations included in input data subset 1114 allocated to the respective second worker device 1100 using, for example, $L = \text{cholesky}(I + W_g^{0.5} K W_g^{0.5})$, where I is an $N \times N$ diagonal identity matrix, where N is a number of observations included in the input data.

In an operation 1414, select a next observation $x_i$ from input data subset 1114 allocated to the respective second worker device 1100. For example, on a first iteration of operation 1414, a first observation is read from input data subset 1114; on a second of operation 1414, a second observation is read from input data subset 1114; and so on.

In an operation 1416, a posterior latent function value $f$ is computed for the selected next observation using, for example, $f=k^T(x)\nabla \log l(x_i)$, where T indicates a transpose, $\nabla$ indicates a first derivative of a logarithm of the likelihood function, $l(x_i)$ is a likelihood function value computed for the selected next observation $x_i$, and $k(x_i)$ is a vector having length N that is a projection of the selected next observation using a kernel bivariate function selected based on the kernel function indicated in operation 508 such as Gaussian, linear, exponential, etc. and using K as $$k(x_i) = \frac{1}{N}\sum_{j=1}^{N} K(x_i - x_j).$$

For example, $\nabla \log l(x_i)=(x_i-\pi)$, when $$l(x_i) = \frac{1}{1+e^{-x_i}}.$$

In an operation 1418, a v vector is computed for the selected next observation using, for example, $v=L\backslash(W_g^{0.5}k(x_i))$.

In an operation 1420, a V value is computed for the selected next observation using, for example, $V=k(x_i,x_i)-v^T v$, where $k(x_i,x_i)$ is an $i^{th}$ value selected from $k(x_i)$.

In an operation 1422, a prediction probability value $\pi$ is computed for the selected next observation using, for example, $\pi=\int\sigma(z)N(z|f,V)$ and a Laplacian approximation. The prediction probability value $\pi$ indicates a probability that the selected next observation belongs to a first of two possible classes. To classify the selected next observation, a threshold such as 0.5 can be applied to select between the two possible classes. For illustration, the computation of prediction probability value $\pi$ is described in a paper by Williams, Christopher K. I. and David Barber, *Bayesian Classification With Gaussian Processes*, IEEE Trans. Pattern Anal. Mach. Intell. 20 1342-1351 (1998). To compute the Gaussian integral over the logistic sigmoid function, an approximation based on an expansion of a sigmoid function in terms of an error function can be used. For illustration, a basis set of five scaled error functions can be used to interpolate the logistic sigmoid at the selected next observation $x_i$. For example, $$\lambda[0] = 0.41$$
$$\lambda[1] = 0.4$$
$$\lambda[2] = 0.37$$
$$\lambda[3] = 0.44$$
$$\lambda[4] = 0.39$$
$$x[0] = 0.0$$
$$x[1] = 0.6$$
$$x[2] = 2.0$$
$$x[3] = 2.5$$

-continued $$x[4] = 4.5$$
$$x[5] = \infty$$

for $i = 0, 1, 2, 3, 4, 5$ for $j = 0, 1, 2, 3, 4$ $$A[i, j] = \frac{\text{erf}(x[i]\times\lambda[j]) + 1}{2}$$

end for $$b[i] = \frac{1}{1+e^{-x[i]}}$$

end for $$\xi = A^{-1}b$$

for $j = 0, 1, 2, 3, 4$ $$a = \lambda[j]\frac{f(x_i)}{\sqrt{1+2V\lambda^2[j]}}$$

$$r[j] = \text{erf}(a)/2$$

end for $$\pi^* = \langle r, \xi\rangle + 0.5$$

where $f(x_i)$ indicates the posterior latent function value $f$ for the selected next observation vector that defines a mean function, the V value defines a deviation value, erf indicates a Gauss error function, $\otimes$ indicates an outer product, and $<r,\xi>$ indicates an inner product of r and $\xi$. $\lambda$, $\xi$, a, r are vectors with a length of five, b and x are vectors of length of six, and A is a matrix of size six by five. $\pi^*$ is a probability that $x_i$ is placed into a Class 1. $\xi$ may be computed only on a first iteration.

In an operation 1424, the prediction probability value $\pi$ and/or the selected classification are output to classification output data subset 1116. The selected next observation may further be output to classification output data subset 1116 in association with the prediction probability value $\pi$ and/or the selected classification.

In an operation 1426, a determination is made concerning whether input data subset 1114 includes another observation. If input data subset 1114 includes another observation, processing continues in operation 1414 to select and process the next observation. If input data subset 1114 does not include another observation, processing continues in an operation 1428.

In operation 1428, an indicator that the observations in input data subset 1114 have been classified is sent from each second worker device 1100 of second worker system 806 to second controller device 804, and processing continues in operation 1310 of FIG. 13.

Experimental results were generated using the operations of classification model training application 222 and classification application 922 with three different datasets. A first dataset included two linearly separable Gaussian distributions with each including 50 observations. A second dataset included two crescent shaped distributions with each including 300 observations. A third dataset included two concentric circle shaped distributions, with each including 300 observations.

Figure 15A:
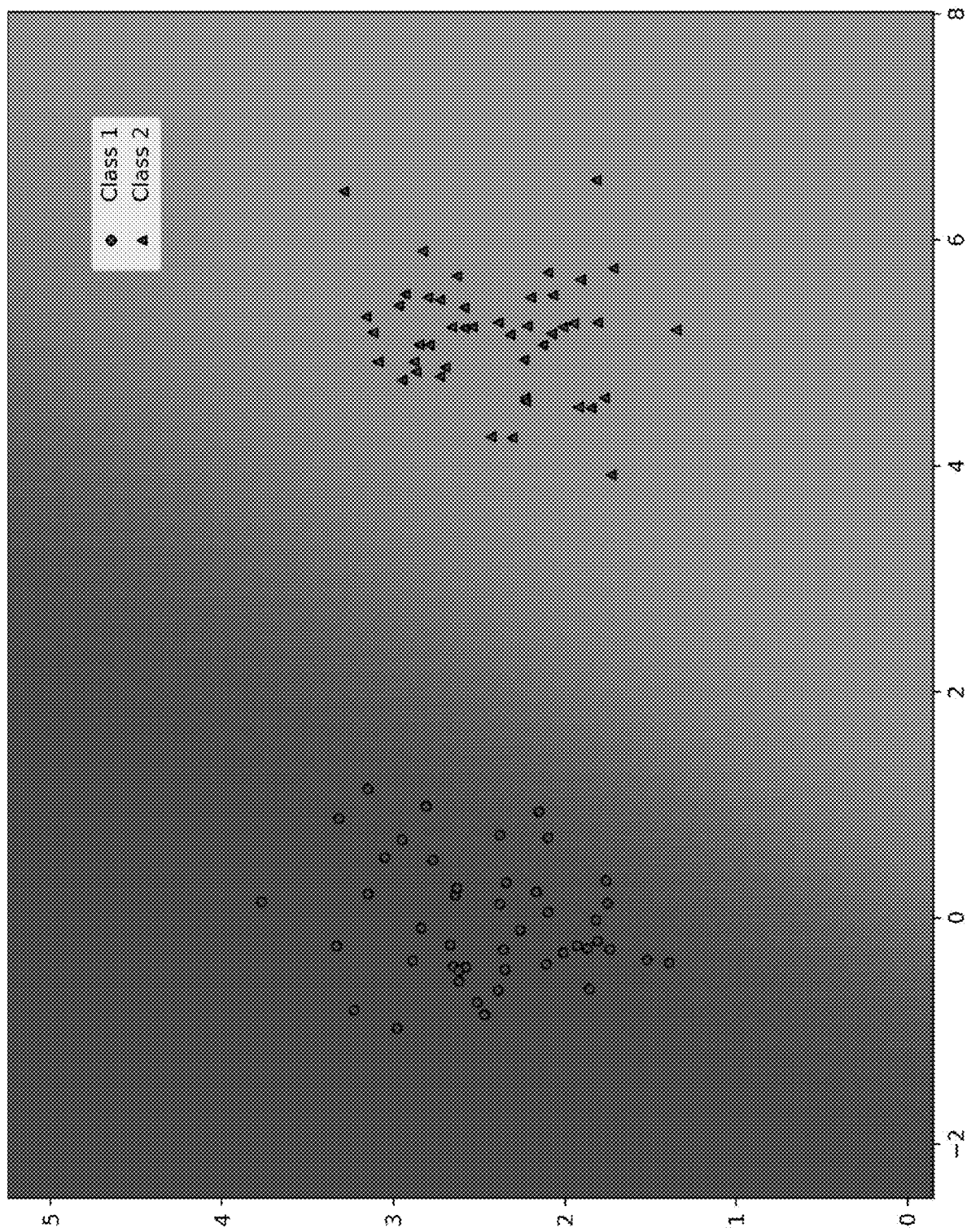
FIG. 15A shows a classification and a probability grid for a first dataset computed by the classification system of FIG. 8 in accordance with an illustrative embodiment.

Referring to FIG. 15A, a classification and a probability grid for the first dataset are shown in accordance with an illustrative embodiment. The two classes are colored as red and green, with the gradual changing of colors reflecting the predicted probability value for each observation over the two classes. For example, a predicted probability value less than 0.5 is a shade of red based on how much less than 0.5 the predicted probability value is, and a predicted probability value greater than 0.5 is a shade of green based on how much greater than 0.5 the predicted probability value is. Classification model training application 222 and classification application 922 resulted in 100% accuracy.

Figure 15B:
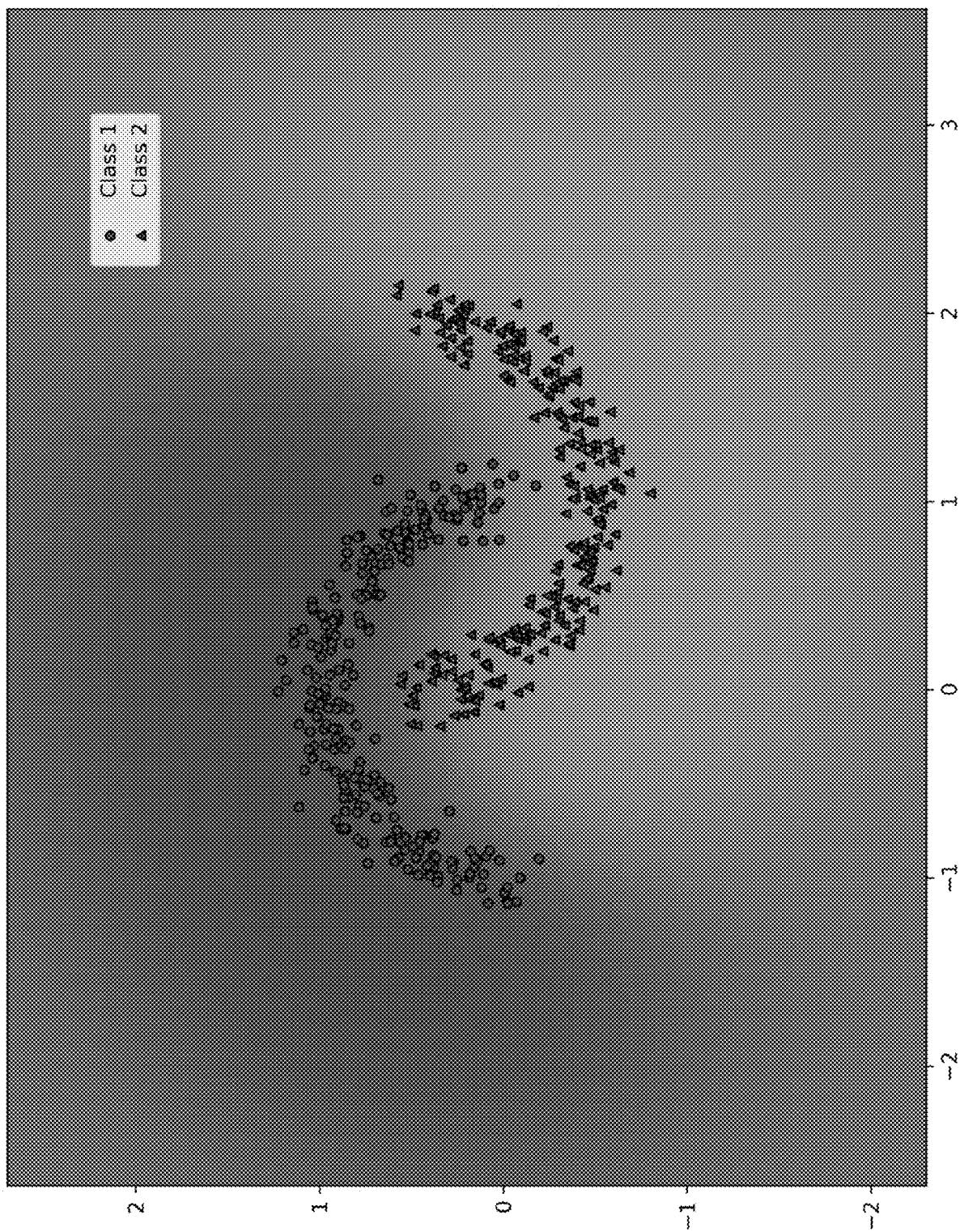
FIG. 15B shows a classification and a probability grid for a second dataset computed by the classification system of FIG. 8 in accordance with an illustrative embodiment.

Referring to FIG. 15B, a classification and a probability grid for the second dataset are shown in accordance with an illustrative embodiment. The two classes are colored as red and green, with the gradual changing of colors reflecting the predicted probabilities over the two classes. Classification model training application 222 and classification application 922 resulted in 98.5% accuracy.

Figure 15C:
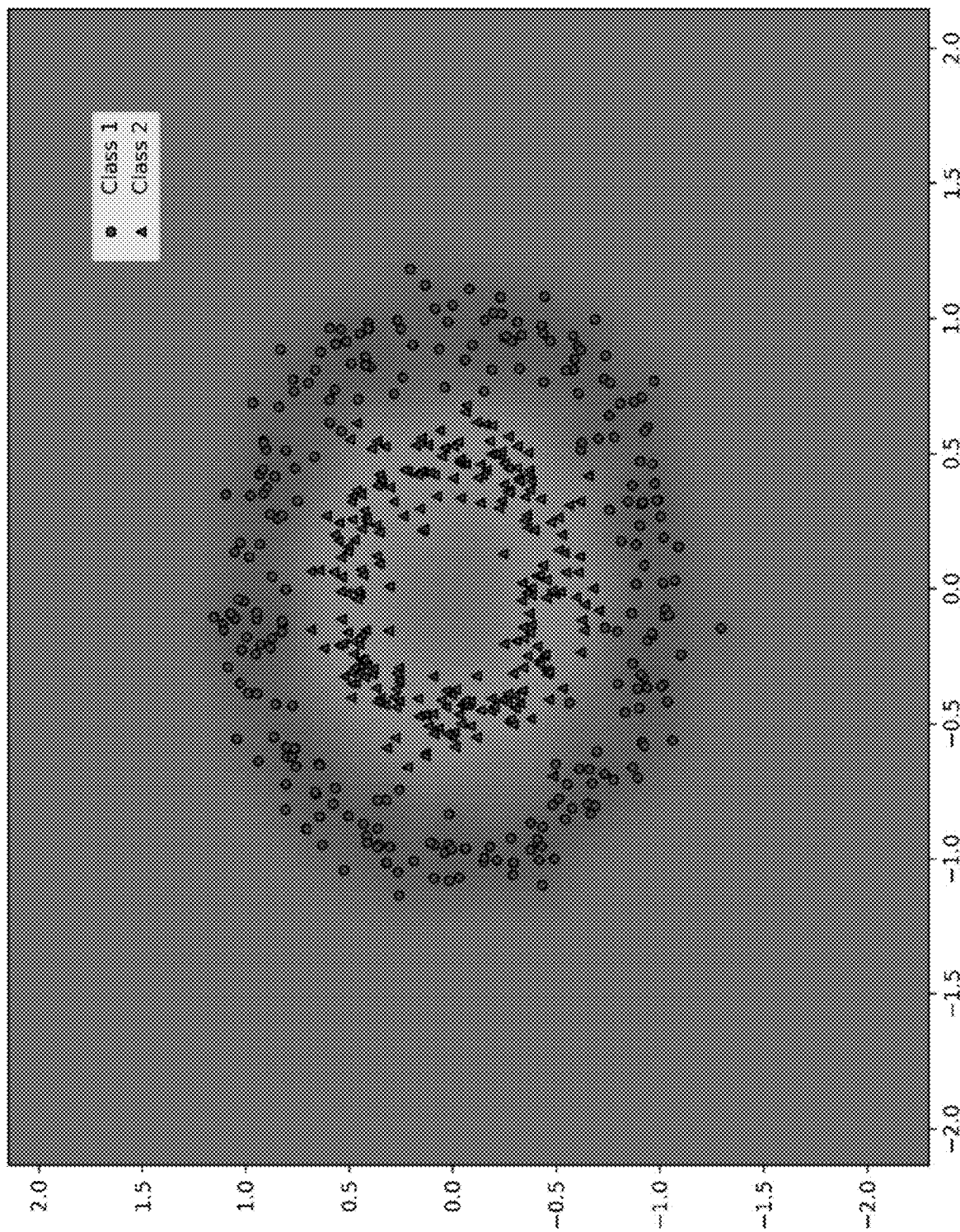
FIG. 15C shows a classification and a probability grid for a third dataset computed by the classification system of FIG. 8 in accordance with an illustrative embodiment.

Referring to FIG. 15C, a classification and a probability grid for the third dataset are shown in accordance with an illustrative embodiment. The two classes are colored as red and green, with the gradual changing of colors reflecting the predicted probabilities over the two classes. Classification model training application 222 and classification application 922 resulted in 99.5% accuracy.

Figure 16A:
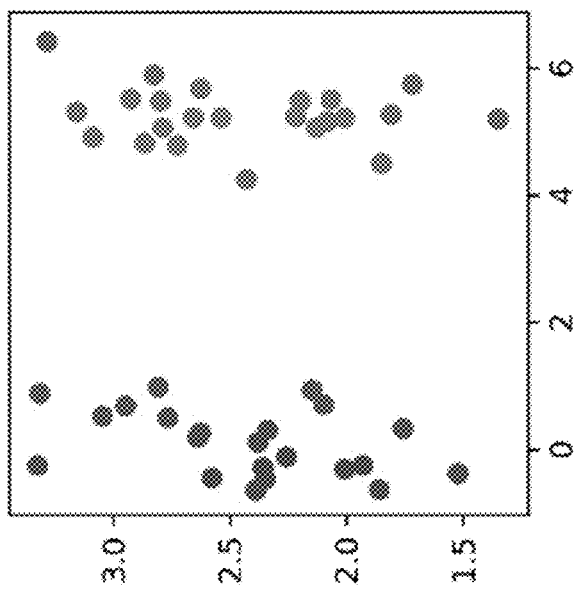
FIGS. 16A to 16D show a classification computed for the first dataset using four different classification systems in accordance with an illustrative embodiment.

Referring to FIGS. 16A to 16D, a classification computed for the first dataset using four different classification systems is shown in accordance with an illustrative embodiment. Referring to FIG. 16A, a classification for the first dataset is shown using classification model training application 222 and classification application 922. The computation time was 1.5 seconds. The accuracy was 100%.

Figure 16B:
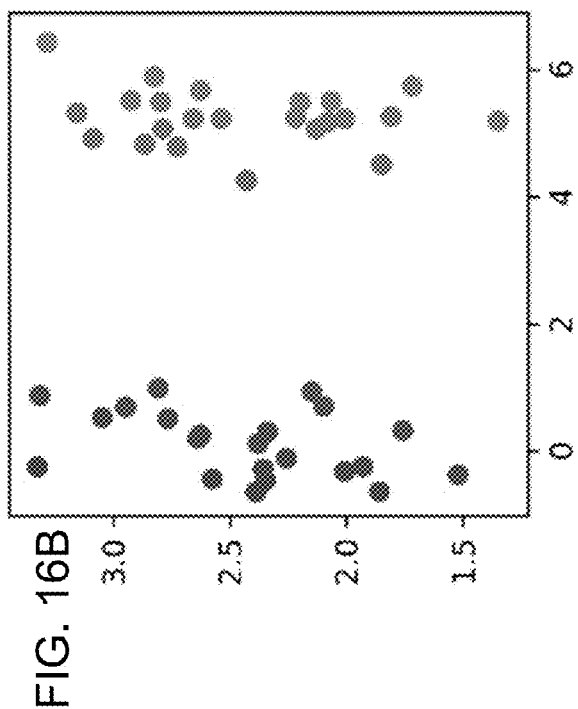

Referring to FIG. 16B, a classification for the first dataset is shown using a support vector machine classification algorithm. The computation time was 2.3 seconds. The accuracy was 100%.

Figure 16C:
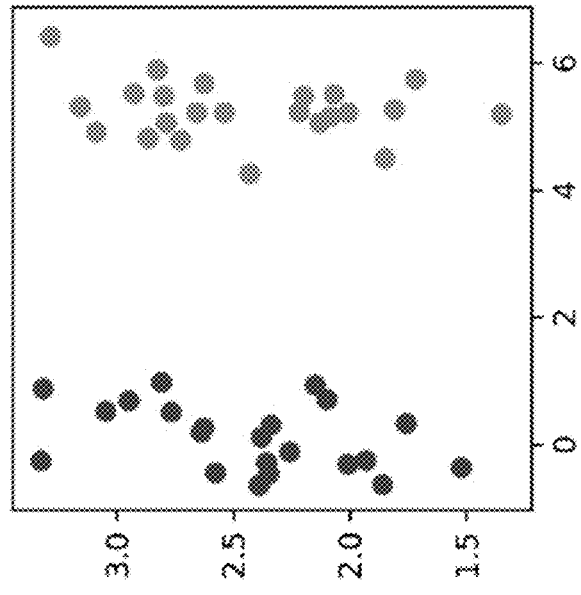

Referring to FIG. 16C, a classification for the first dataset is shown using a neural network classification algorithm. The computation time was 3.0 seconds. The accuracy was 100%.

Figure 16D:
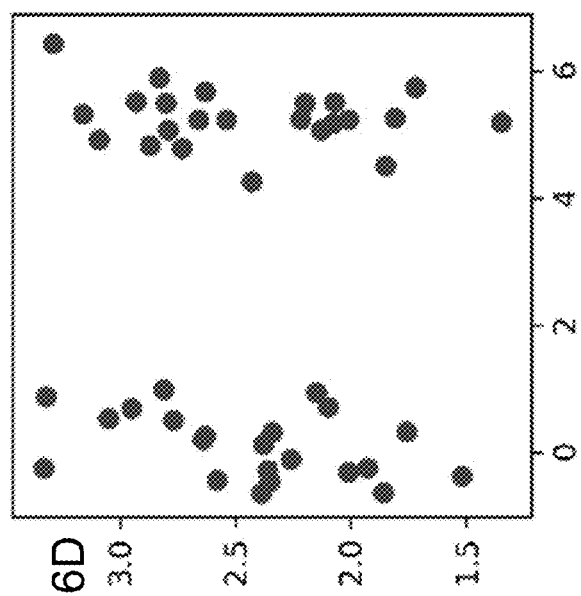

Referring to FIG. 16D, a classification for the first dataset is shown using a k-nearest neighbors classification algorithm. The computation time was 5.8 seconds. The accuracy was 100%.

Figure 17A:
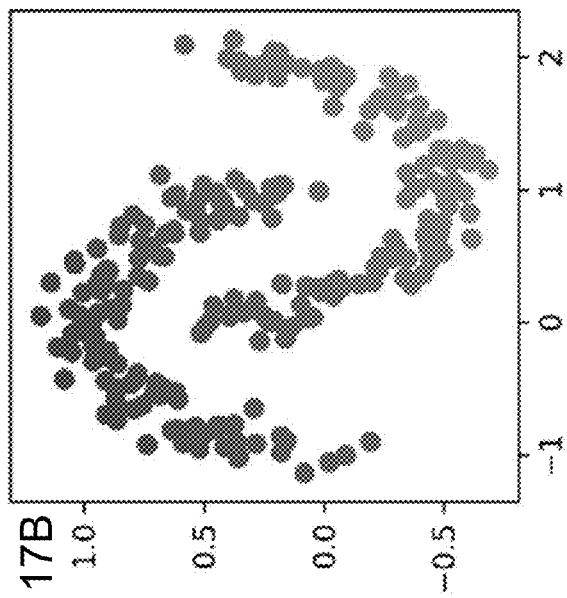
FIGS. 17A to 17D show a classification computed for the second dataset using four different classification systems in accordance with an illustrative embodiment.

Referring to FIGS. 17A to 17D, a classification computed for the second dataset using the four different classification systems is shown in accordance with an illustrative embodiment. Referring to FIG. 17A, a classification for the second dataset is shown using classification model training application 222 and classification application 922. The computation time was 1.3 seconds. The accuracy was 100%.

Figure 17B:
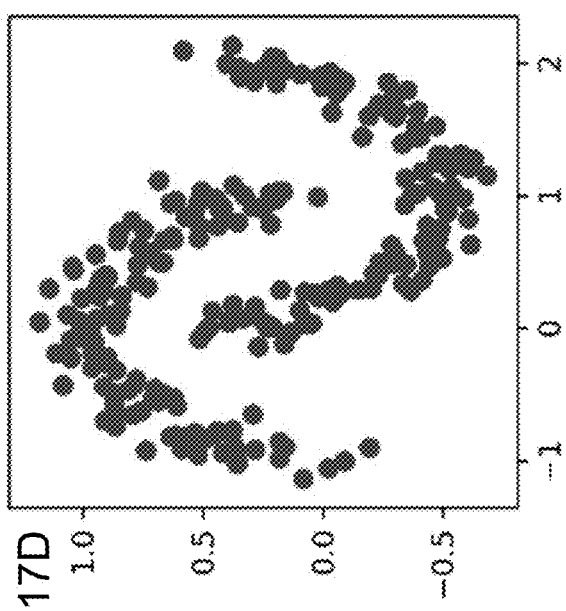

Referring to FIG. 17B, a classification for the second dataset is shown using the support vector machine (SVM) classification algorithm. The computation time was 3.0 seconds. The accuracy was 87.6%.

Figure 17C:
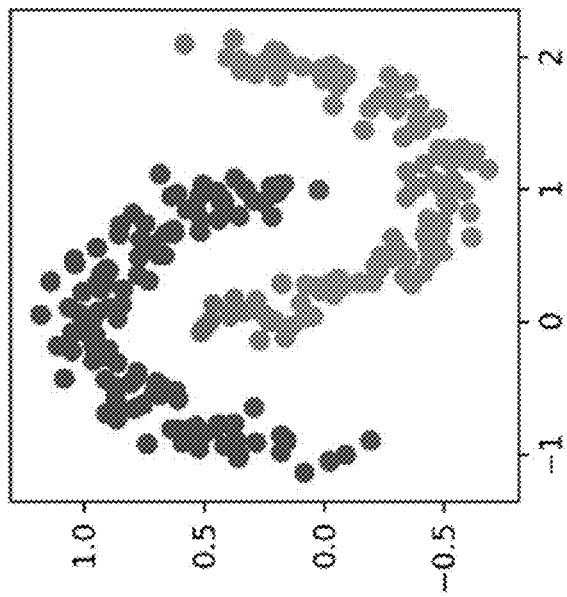

Referring to FIG. 17C, a classification for the second dataset is shown using the neural network (neural net) classification algorithm. The computation time was 6.8 seconds. The accuracy was 100%.

Figure 17D:
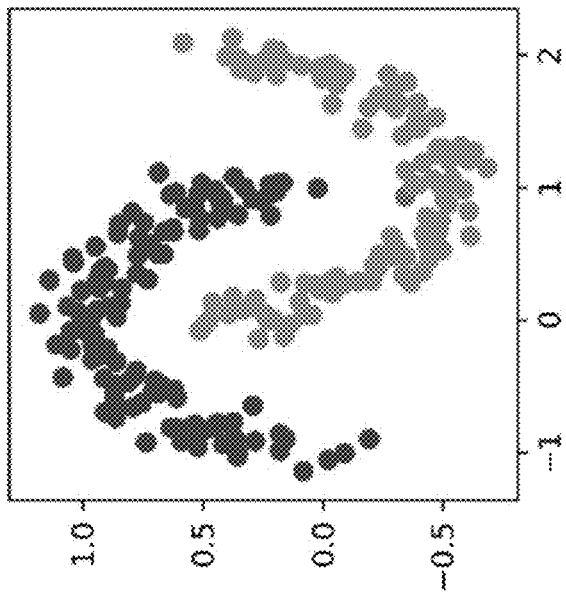

Referring to FIG. 17D, a classification for the second dataset is shown using the k-nearest neighbors (KNN) classification algorithm. The computation time was 97.9 seconds. The accuracy was 100%.

Figure 18B:
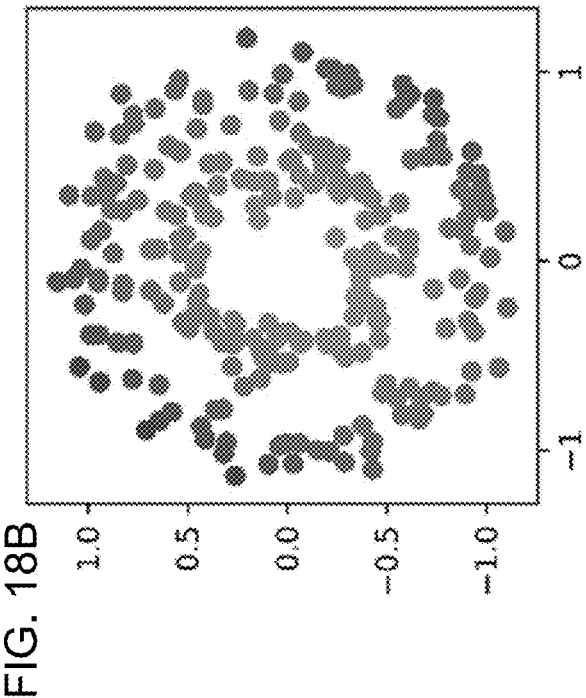
FIGS. 18A to 18D show a classification computed for the third dataset using four different classification systems in accordance with an illustrative embodiment.
Figure 18D:
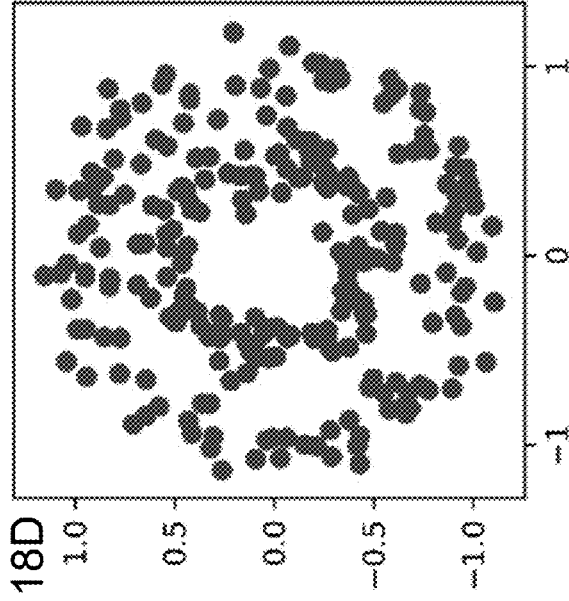
Figure 18A:
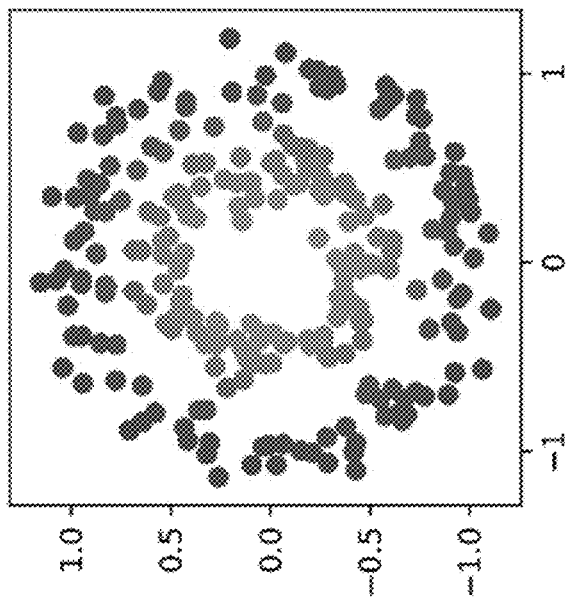

Referring to FIGS. 18A to 18D, a classification computed for the third dataset using the four different classification systems is shown in accordance with an illustrative embodiment. Referring to FIG. 18A, a classification for the third dataset is shown using classification model training application 222 and classification application 922. The computation time was 1.3 seconds. The accuracy was 99.2%.

Referring to FIG. 18B, a classification for the third dataset is shown using the support vector machine classification algorithm. The computation time was 2.7 seconds. The accuracy was 71.2%.

Figure 18C:
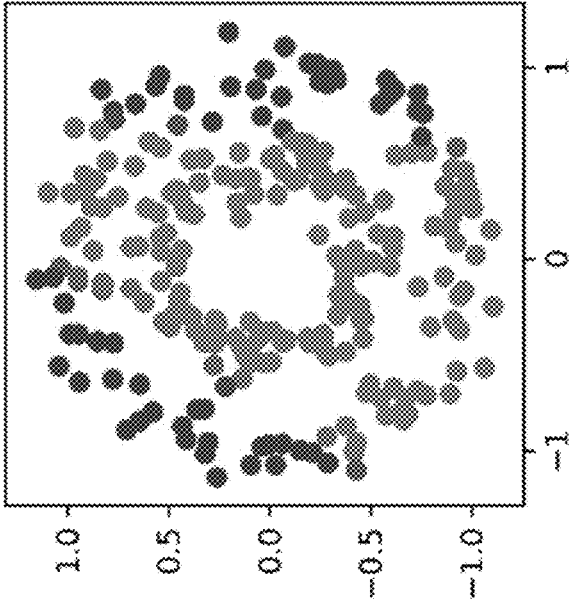

Referring to FIG. 18C, a classification for the third dataset is shown using the neural network classification algorithm. The computation time was 7.6 seconds. The accuracy was 73.6%.

Referring to FIG. 18D, a classification for the third dataset is shown using the k-nearest neighbors classification algorithm. The computation time was 97.6 seconds. The accuracy was 98%.

Table I below summarizes the classification accuracy performance for the three datasets.

TABLE I

| Dataset | 222/922 | SVM | Neural Net | KNN |
| --- | --- | --- | --- | --- |
| First | 100 | 100 | 100 | 100 |
| Second | 100 | 87.6 | 100 | 100 |
| Third | 99.2 | 71.2 | 73.6 | 98 |

Table II below summarizes the computation time performance for the three datasets.

TABLE II

| Dataset | 222/922 | SVM | Neural Net | KNN |
| --- | --- | --- | --- | --- |
| First | 1.5 | 2.3 | 3 | 5.8 |
| Second | 1.3 | 3.0 | 6.8 | 97.9 |
| Third | 1.3 | 2.7 | 7.6 | 97.6 |

Using classification model training application 222 and classification application 922 provides both significantly more accurate and faster results. The prediction probability computed by classification model training application 222 and classification application 922 further indicates a level of confidence associated with each classification.

Figure 19:
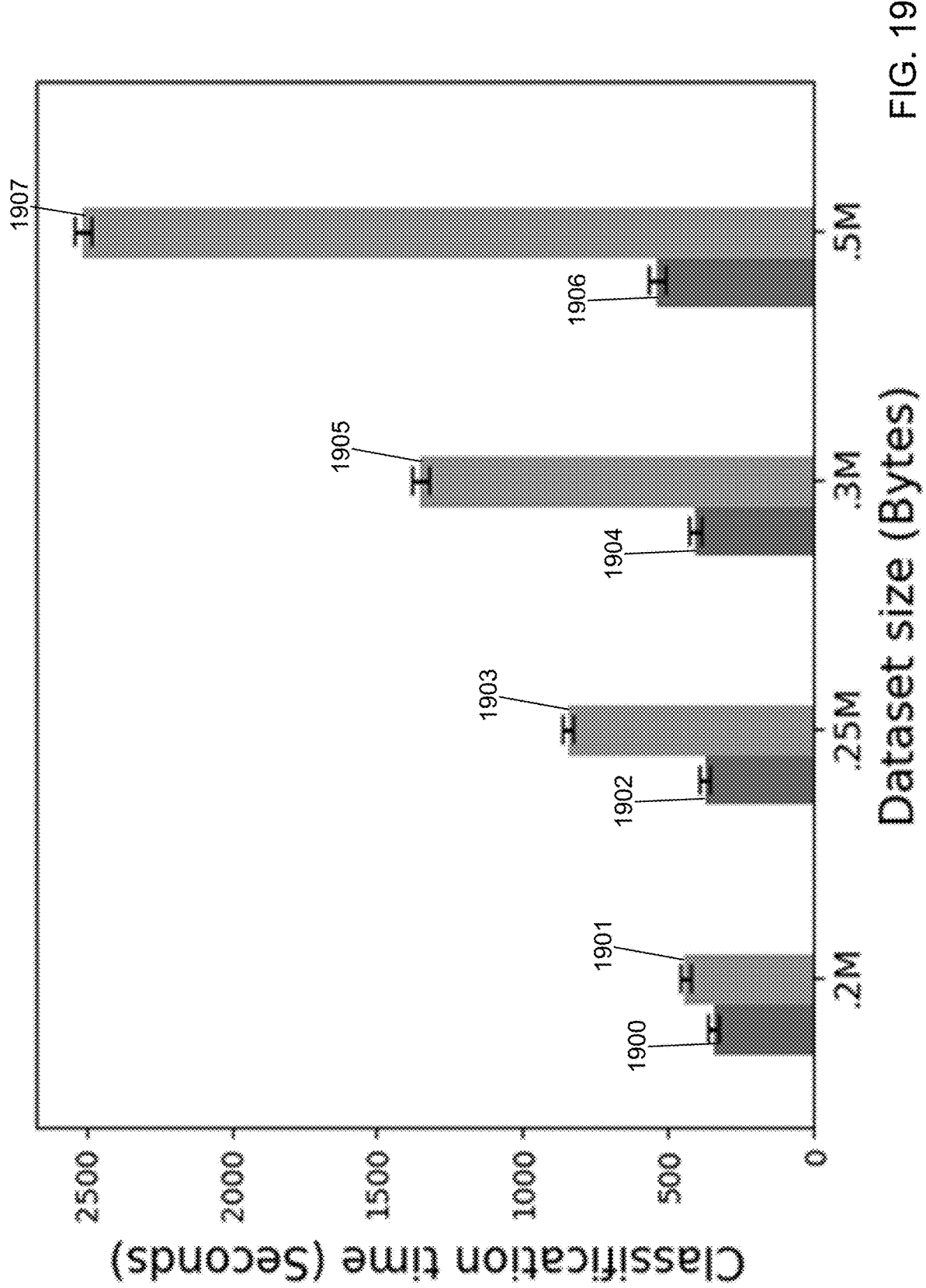
FIG. 19 shows a classification computing time comparison between two different classification systems using a dataset with successively increasing numbers of observation vectors in accordance with an illustrative embodiment.

Referring to FIG. 19, a classification run time comparison between two different classification systems using a dataset with successively increasing numbers of observation vectors is shown in accordance with an illustrative embodiment. A first bar 1900 represents a computation time using classification model training application 222 and classification application 922 that provides distributed processing with 200,000 observations. A second bar 1901 represents a computation time using a serial implementation of GPC processing with LA inference with 200,000 observations. The training dataset included 0.1 million observations and the testing data size was gradually increased from 0.15 million to 0.4 million with the total data size from 0.25 million to 0.5 million.

A third bar 1902 represents a computation time using classification model training application 222 and classification application 922 that provides distributed processing with 250,000 observations. A fourth bar 1903 represents a computation time using the serial implementation of GPC processing with LA inference with 250,000 observations.

A fifth bar 1904 represents a computation time using classification model training application 222 and classification application 922 that provides distributed processing with 300,000 observations. A sixth bar 1905 represents a computation time using the serial implementation of GPC processing with LA inference with 300,000 observations.

A seventh bar 1906 represents a computation time using classification model training application 222 and classification application 922 that provides distributed processing with 500,000 observations. An eighth bar 1907 represents a computation time using the serial implementation of GPC processing with LA inference with 500,000 observations.

As the size of the dataset increases, the computing time increases exponentially for the serial implementation of GPC processing with LA inference while the computing time remains relatively flat using classification model training application 222 and classification application 922. The serial implementation of GPC processing with LA inference further cannot reasonably be applied to a dataset unless it can be stored on a single computing device because the computation time becomes intractable. There is further no loss in accuracy when using classification model training application 222 and classification application 922 relative to the serial implementation of GPC processing with LA inference.

There are applications for classification model training application 222 and classification application 922 in many areas such as process control and equipment health monitoring, image processing and classification, data segmentation, data analysis, etc. Classification model training application 222 and classification application 922 provide efficient distributed and parallel computing device implementations for training and using classification models based on GPC processing with LA inference. The presented results demonstrate improved or identical accuracy with significantly faster computing times and application to big data that cannot be stored on a single computing device.

The explosion of digital data is generating many opportunities for big data analytics, which in turn provides many opportunities for training classification models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

send a first computation request to a plurality of worker computing devices;

receive a first response to the first computation request from each worker computing device of the plurality of worker computing devices, wherein each first response includes a first matrix computed as a second order derivative of a logarithm of a predefined likelihood function on a subset of training data distributed to each respective worker computing device, wherein the training data includes a plurality of observation vectors, wherein each observation vector of the plurality of observation vectors includes a value for each variable of a plurality of variables;

define a global first matrix by concatenating the first matrix from each worker computing device of the plurality of worker computing devices;

compute a kernel matrix using an entirety of the training data and a predefined kernel function;

send a second computation request to the plurality of worker computing devices, wherein the second computation request indicates that each worker computing device compute a classification probability for each observation vector of the plurality of observation vectors distributed to a respective worker computing device using the defined global first matrix and the computed kernel matrix; and output the determined classification probability for each observation vector of the plurality of classified observation vectors.

2. The non-transitory computer-readable medium of claim 1, wherein the predefined likelihood function is a sigmoid function.

3. The non-transitory computer-readable medium of claim 2, wherein the predefined likelihood function is $$\frac{1}{1+e^{-x}},$$

where x is an observation vector of the plurality of observation vectors.

4. The non-transitory computer-readable medium of claim 2, wherein the predefined likelihood function is $$\int_{-\infty}^{x} \mathcal{N}(\tau \mid 0, 1) d\tau,$$

where x is an observation vector of the plurality of observation vectors, $N(\tau|0,1)$ is a standard normal distribution, and the predefined likelihood function computes a probability that the observation vector x is less than or equal to a $\tau^{th}$ quantile of the standard normal distribution.

5. The non-transitory computer-readable medium of claim 1, wherein the first matrix is computed using $W_w = -\nabla\nabla \log l(x_i)$, $i=1, 2, \ldots, N_{ow}$, where $\nabla\nabla$ indicates the second order derivative of the logarithm of the predefined likelihood function, $l(x_i)$ is the predefined likelihood function value computed for an $i^{th}$ observation vector $x_i$ included in the subset of training data distributed to each respective worker computing device, and $N_{ow}$ is a number of observation vectors included in the subset of training data distributed to each respective worker computing device.

6. The non-transitory computer-readable medium of claim 1, wherein the predefined kernel function is a Gaussian kernel function, and the kernel matrix is computed using $$K(x_i, x_j) = \exp\frac{-\|x_i - x_j\|^2}{2s^2} \quad i = 1, \ldots, N, j = 1, \ldots, N,$$

where $x_i$ is an $i^{th}$ observation vector of the training data, $x_j$ is a $j^{th}$ observation vector of the training data, N is a number of observation vectors included in the training data, and s is a Gaussian bandwidth parameter value.

7. The non-transitory computer-readable medium of claim 1, wherein
computing the classification probability comprises:
computing a decomposition matrix of the subset of training data distributed to each respective worker computing device based on the defined global first matrix and the computed kernel matrix;
(A) receiving an observation vector;
(B) computing a posterior latent function value for the received observation vector based on a first order derivative of the logarithm of the predefined likelihood function;
(C) computing a first vector for the received observation vector based on the defined global first matrix and the computed decomposition matrix; and
(D) computing a deviation value for the received observation vector based on the computed first vector, wherein the classification probability is computed based on the computed deviation value and the computed posterior latent function value for the received observation vector.

8. The non-transitory computer-readable medium of claim 7, wherein the observation vector is received by reading the observation vector from an input data subset stored at each worker computing device of the plurality of worker computing devices.

9. The non-transitory computer-readable medium of claim 8, wherein (A) through (D) are repeated with each remaining observation vector included in the input data subset stored at each worker computing device of the plurality of worker computing devices as the observation vector.

10. The non-transitory computer-readable medium of claim 7, wherein the decomposition matrix is computed using L=cholesky(I+$W_g^{0.5}$K$W_g^{0.5}$), where L is the decomposition matrix, cholesky indicates a Cholesky decomposition, I is an N×N diagonal identity matrix, $W_g$ is the defined global first matrix, K is the computed kernel matrix, and N is a number of observation vectors included in the training data.

11. The non-transitory computer-readable medium of claim 10, wherein the posterior latent function value is computed using $f=k^T(x_i)\nabla \log l(x_i)$, where $f$ is the posterior latent function value, $k(x_i)$ is a vector having length N that is a projection of $x_i$ using a kernel bivariate function selected based on the predefined kernel function, $x_i$ is the received observation vector, T indicates a transpose, $\nabla$ indicates the first order derivative of the logarithm of the predefined likelihood function, and $l(x_i)$ is the predefined likelihood function value computed for $x_i$.

12. The non-transitory computer-readable medium of claim 11, wherein the first vector is computed using v=L\ ($W_g^{0.5}$k($x_i$)), where v is the first vector.

13. The non-transitory computer-readable medium of 12, wherein the deviation value is computed using V=k($x_i,x_i$)−$v^T$v, where $\nabla$ is the deviation value, and k($x_i,x_i$) is an $i^{th}$ value of k($x_i$).

14. The non-transitory computer-readable medium of claim 1, wherein the determined classification probability is output by each worker computing device of the plurality of worker computing devices for each observation vector included in the subset of input data distributed to each respective worker computing device.

15. The non-transitory computer-readable medium of claim 1, wherein the classification probability is defined for each class of a plurality of classes.

16. The non-transitory computer-readable medium of claim 15, further comprising computer-readable instructions that cause the computing device to:
determine the class of the plurality of classes for each observation vector of the plurality of observation vectors based on a maximum value of the determined classification probability for a respective observation vector and a respective class, and
output the determined class for each observation vector of the plurality of observation vectors, wherein the determined class is defined to represent a label for the respective observation vector.

17. The non-transitory computer-readable medium of claim 1, wherein the predefined likelihood function is defined by training using the training data before sending the second computation request.

18. The non-transitory computer-readable medium of claim 17, wherein the training data is stored on each worker computing device of the plurality of worker computing devices, and wherein a unique subset of the training data is stored on each worker computing device of the plurality of worker computing devices, wherein in combination, the unique subset stored on each worker computing device of the plurality of worker computing devices includes all of the plurality of observation vectors.

19. The non-transitory computer-readable medium of claim 18, wherein training using the training data comprises:
(A) computing a second matrix using the defined global first matrix and the computed kernel matrix;
(B) sending a third computation request to the plurality of worker computing devices;
(C) receiving a second response to the third computation request from each worker computing device of the plurality of worker computing devices, wherein each second response includes a first vector computed from a first order derivative of the logarithm of the predefined likelihood function on the subset of training data distributed to each respective worker computing device;
(D) define a global first vector by concatenating the first vector from each worker computing device of the plurality of worker computing devices;
(E) sending a fourth computation request to the plurality of worker computing devices;
(F) receiving a third response to the fourth computation request from each worker computing device of the plurality of worker computing devices, wherein each second response includes a second vector computed from the defined global first vector;
(G) define a global second vector by concatenating the second vector from each worker computing device of the plurality of worker computing devices;
(H) sending a fifth computation request to the plurality of worker computing devices;
(I) receiving a fourth response to the fifth computation request from each worker computing device of the plurality of worker computing devices, wherein each second response includes a latent function vector computed from the defined global second vector; and (J) define a global latent function vector by concatenating the latent function vector from each worker computing device of the plurality of worker computing devices.

20. The non-transitory computer-readable medium of claim 19, wherein the second matrix is computed using $B=W_g^{0.5}KW_g^{0.5}$, where $W_g$ is the defined global first matrix and $K$ is the computed kernel matrix.

21. The non-transitory computer-readable medium of claim 20, wherein the first vector is computed using $b_w=W_g f_g+\nabla \log l(x_i)$, $i=1, 2, \ldots, N_{ow}$, where $f_g$ is the defined global latent function, $\nabla$ indicates the first order derivative of the logarithm of the predefined likelihood function, $l(x_i)$ is the predefined likelihood function value computed for $x_i$, $x_i$ is an $i^{th}$ observation vector included in the subset of training data, and $N_{ow}$ is a number of observation vectors included in the subset of training data.

22. The non-transitory computer-readable medium of claim 21, wherein the second vector is computed using $a=b_g-W_g^{0.5}L^T\backslash(L\backslash(W_g^{0.5}KW_g^{0.5}))$, where $b_g$ is the defined global first vector, and $L$ is a decomposition matrix of the subset of training data distributed to each respective worker computing device based on the defined global first matrix and the computed kernel matrix, and $T$ indicates a transpose.

23. The non-transitory computer-readable medium of claim 22, wherein the decomposition matrix is computed using $L=\text{cholesky}(I+W_g^{0.5}KW_g^{0.5})$, where $L$ is the decomposition matrix, cholesky indicates a Cholesky decomposition, $I$ is an $N \times N$ diagonal identity matrix, $W_g$ is the defined global first matrix, $K$ is the computed kernel matrix, and $N$ is a number of observation vectors included in the training data.

24. The non-transitory computer-readable medium of claim 22, wherein the latent function vector is computed using $f=Ka_g$, where $f$ is the latent function vector, and $a_g$ is the defined global second vector.

25. The non-transitory computer-readable medium of claim 24, wherein training using the training data further comprises:
(K) computing an objective function value;
(L) comparing the computed objective function value to the objective function value computed on a prior iteration of (K); and
repeating (A) through (L) until convergence is determined based on the comparison in (L).

26. The non-transitory computer-readable medium of claim 25, wherein the objective function value is computed using $C=-0.5a_g^T f_g+\log l(x_i)$, $i=1, 2, \ldots, N$, where $C$ is the objective function value.

27. The non-transitory computer-readable medium of claim 26, wherein a difference value $\Delta C$ is computed using $\Delta C=|C-C_p|$, where $C_p$ is the objective function value computed on the prior iteration of (K).

28. The non-transitory computer-readable medium of claim 27, wherein convergence is determined when $\Delta C < Th$, where $Th$ is a predefined convergence threshold.

29. A system comprising:
a processor; and
a computer-readable medium operably coupled to the processor, the computer-readable medium having computer-readable instructions stored thereon that, when executed by the processor, cause the system to
send a first computation request to a plurality of worker computing devices;
receive a first response to the first computation request from each worker computing device of the plurality of worker computing devices, wherein each first response includes a first matrix computed as a second order derivative of a logarithm of a predefined likelihood function on a subset of training data distributed to each respective worker computing device, wherein the training data includes a plurality of observation vectors, wherein each observation vector of the plurality of observation vectors includes a value for each variable of a plurality of variables;
define a global first matrix by concatenating the first matrix from each worker computing device of the plurality of worker computing devices;
compute a kernel matrix using an entirety of the training data and a predefined kernel function;
send a second computation request to the plurality of worker computing devices, wherein the second computation request indicates that each worker computing device compute a classification probability for each observation vector of the plurality of observation vectors distributed to a respective worker computing device using the defined global first matrix and the computed kernel matrix; and
output the determined classification probability for each observation vector of the plurality of classified observation vectors.

30. A method of distributed execution of a trained classification model, the method comprising:
sending, by a computing device, a first computation request to a plurality of worker computing devices;
receiving, by the computing device, a first response to the first computation request from each worker computing device of the plurality of worker computing devices, wherein each first response includes a first matrix computed as a second order derivative of a logarithm of a predefined likelihood function on a subset of training data distributed to each respective worker computing device, wherein the training data includes a plurality of observation vectors, wherein each observation vector of the plurality of observation vectors includes a value for each variable of a plurality of variables;
defining, by the computing device, a global first matrix by concatenating the first matrix from each worker computing device of the plurality of worker computing devices;
computing, by the computing device, a kernel matrix using an entirety of the training data and a predefined kernel function;
sending, by the computing device, a second computation request to the plurality of worker computing devices, wherein the second computation request indicates that each worker computing device compute a classification probability for each observation vector of the plurality of observation vectors distributed to a respective worker computing device using the defined global first matrix and the computed kernel matrix; and
outputting, by the computing device the determined classification probability for each observation vector of the plurality of classified observation vectors.

* * * * *

UNITED STATES PATENT AND TRADEMARK OFFICE
CERTIFICATE OF CORRECTION

Page 1 of 2

PATENT NO. : 10,872,277 B1
APPLICATION NO. : 16/935586
DATED : December 22, 2020
INVENTOR(S) : Yingjian Wang It is certified that error appears in the above-identified patent and that said Letters Patent is hereby corrected as shown below:

In the Specification

Column 5, Line 5:

Delete the phrase "a $N_w{}^{th}$ server" and replace with --a $N_w^{th}$ server--.

Column 5, Line 22:

Delete the phrase "and $N_w{}^{th}$ server computer" and replace with --and $N_w^{th}$ server computer--.

Column 14, Line 63:

Delete the phrase "$B = W_g{}^{0.5} K W_g{}^{0.5}$." and replace with --$B = W_g^{0.5} K W_g^{0.5}$--.

Column 17, Line 30:
Delete the phrase "$a = b_g - W_g{}^{0.5} L^T \backslash (L \backslash (W_g{}^{0.5} K b_g))$" and replace with
--$a = b_g - W_g^{0.5} L^T \backslash (L \backslash (W_g^{0.5} K b_g))$--.

Column 19, Line 9:

Delete the phrase "a $N_w{}^{th}$ server computer" and replace with --a $N_w^{th}$ server computer--.

Column 19, Line 26:

Delete the phrase "$N_w{}^{th}$ server computer" and replace with --$N_w^{th}$ server computer--.

Column 24, Line 62:
Delete the phrase "$L = cholesky(I + W_g{}^{0.5} K W_g{}^{0.5})$" and replace with
--$L = cholesky(I + W_g^{0.5} K W_g^{0.5})$--.

Signed and Sealed this
Fifth Day of October, 2021

Drew Hirshfeld
*Performing the Functions and Duties of the
Under Secretary of Commerce for Intellectual Property and
Director of the United States Patent and Trademark Office*

Column 25, Lines 28-29:
Delete the phrase "$v = L\backslash(W_g^{0.5}k(x_i))$." and replace with -- $v = L\backslash(W_g^{0.5}k(x_i))$ --.

In the Claims

Claim 10, Column 31, Line 43:
Delete the phrase "$L = cholesky(I + W_g^{0.5}KW_g^{0.5})$" and replace with
-- $L = cholesky(I + W_g^{0.5}KW_g^{0.5})$ --.

Claim 12, Column 31, Lines 60-61:
Delete the phrase "$v = L\backslash(W_g^{0.5}k(x_i))$," and replace with -- $v = L\backslash(W_g^{0.5}k(x_i))$, --.

Claim 13, Column 31, Lines 63-64:
Delete the phrase "using $V = k(x_i, x_i) - v^Tv$, where $\nabla$ is the deviation value," and replace with --using $V = k(x_i, x_i) - v^Tv$, where $V$ is the deviation value,--.

Claim 20, Column 33, Line 6:
Delete the phrase "$B = W_g^{0.5}KW_g^{0.5}$" and replace with -- $B = W_g^{0.5}KW_g^{0.5}$ --.

Claim 21, Column 33, Lines 11-12:
Delete the phrase "V indicates the first order derivative" and replace with --$\nabla$ indicates the first order derivative--.

Claim 22, Column 33, Line 19:
Delete the phrase "$a = b_g - W_g^{0.5}L^T\backslash(L\backslash(W_g^{0.5}KW_g^{0.5}))$" and replace with
-- $a = b_g - W_g^{0.5}L^T\backslash(L\backslash(W_g^{0.5}Kb_g))$ --.

Claim 23, Column 33, Line 26:
Delete the phrase "$L = cholesky(I + W_g^{0.5}KW_g^{0.5})$" and replace with
-- $L = cholesky(I + W_g^{0.5}KW_g^{0.5})$ --.